United States Patent
Nankaku et al.

(10) Patent No.: US 7,472,214 B2
(45) Date of Patent: Dec. 30, 2008

(54) REAL-TIME EMBEDDED SIMPLE MONITOR METHOD AND COMPUTER PRODUCT

(75) Inventors: Shigeki Nankaku, Tokyo (JP); Teiichiro Inoue, Tokyo (JP); Masami Iwahashi, Tokyo (JP); Toshihiro Kawakami, Tokyo (JP)

(73) Assignee: Mitsubishi Denki Kabushiki Kaisha, Chiyoda-Ku, Tokyo (JP)

( * ) Notice: Subject to any disclaimer, the term of this patent is extended or adjusted under 35 U.S.C. 154(b) by 68 days.

(21) Appl. No.: 11/350,068

(22) Filed: Feb. 9, 2006

(65) Prior Publication Data

US 2007/0033384 A1    Feb. 8, 2007

(30) Foreign Application Priority Data

Aug. 5, 2005    (JP)    ............................ 2005-228523

(51) Int. Cl.
*G06F 13/26* (2006.01)

(52) U.S. Cl. .................. 710/264; 710/260; 710/240

(58) Field of Classification Search ......... 710/260–269, 710/100, 240–244
See application file for complete search history.

(56) References Cited

U.S. PATENT DOCUMENTS

| 4,979,055 | A | 12/1990 | Squires et al. | |
|---|---|---|---|---|
| 5,853,874 | A | 12/1998 | Jacob | |
| 6,412,035 | B1 * | 6/2002 | Webber | 710/261 |
| 6,430,593 | B1 * | 8/2002 | Lindsley | 718/103 |
| 2002/0165848 | A1 * | 11/2002 | Rautenbach et al. | 707/1 |

FOREIGN PATENT DOCUMENTS

| JP | 01-298440 | 12/1989 |
|---|---|---|
| JP | 03-157733 | 7/1991 |
| JP | 04-287233 | 10/1992 |
| JP | 05-257718 | 10/1993 |
| JP | 06-187175 | 7/1994 |
| JP | 07-295840 A | 11/1995 |
| JP | 08-077025 A | 3/1996 |
| JP | 10-049386 | 2/1998 |
| JP | 10-254516 | 9/1998 |
| JP | 11-024946 A | 1/1999 |

(Continued)

OTHER PUBLICATIONS

Notice of Allowance issued Mar. 24, 2008 in Taiwan Application No. 0972015128001 (??).

(Continued)

*Primary Examiner*—Clifford H Knoll
*Assistant Examiner*—Kim T Huynh
(74) *Attorney, Agent, or Firm*—Buchanan Ingersoll & Rooney PC

(57) ABSTRACT

A processor context stored in a stack area at a time of an interrupt occurrence is saved in a context saving area of an ICB corresponding to an ISR that is interrupted. The ISR corresponding to the interrupt is set to an execution-waiting state. An ICB having a highest priority from among the ICBs that are set to the execution-waiting state is selected. A processor context saved in a context saving area of the selected ICB is stored in the stack area. An ISR corresponding to an ICB selected by an interrupt return command is executed.

23 Claims, 22 Drawing Sheets

FOREIGN PATENT DOCUMENTS

| | | |
|---|---|---|
| JP | 11-272480 A | 10/1999 |
| JP | 2001-092676 A | 4/2001 |
| JP | 2003-131892 A | 5/2003 |
| JP | 2003-345612 | 12/2003 |
| JP | 2004-127039 A | 4/2004 |
| JP | 2004-152322 | 5/2004 |
| JP | 2005-078450 | 3/2005 |

OTHER PUBLICATIONS

Sha, Lui et al., "Priorty Inheritance Protocols: An Approach to Real-Time Synchronization," IEEE Transaction on Computers, vol. 39, No. 9, Sep. 1990, pp. 1175-1185.

Official Action mailed Oct. 2, 2007 in corresponding Japanese Patent Application No. 2005-228523 and partial English translation.

* cited by examiner

REAL-TIME EMBEDDED SIMPLE MONITOR METHOD AND COMPUTER PRODUCT

BACKGROUND OF THE INVENTION

1. Field of the Invention

The present invention relates to a technology for performing an interrupt processing of an embedded software and a synchronized exclusive control using the interrupt processing.

2. Description of the Related Art

In general, the embedded software secures a real-time operation using an interrupt processing to make a prompt response to a change of an external condition. Furthermore, the embedded software employs a real-time operating system (OS) for an embedded control, such as μITRON, to realize a synchronized exclusive control of a semaphore, an event flag, a mail box, etc.

One of the conventional technologies for realizing the synchronized exclusive control is disclosed in Japanese Patent Application Laid-open Publication No. H7-295840. In this technology, the synchronized exclusive control is realized by setting up an execution condition to a task and controlling an order of execution, so that a memory area and a programming step caused by using an OS of a multiprogramming system that is adapted to an embedded system are deleted. As a result, an efficiency of resources is increased, and a productivity and a maintainability are enhanced.

An event-establishment-condition storing unit stores a type of condition for executing a task, which is set for every vectors obtained by segmentalizing a program, (such as event waiting, message waiting, time waiting, wake-up waiting), and a condition for establishing a state (such as event waiting, and event established). A condition storing unit stores a condition for releasing the event waiting corresponding to a time when an event that is stored in the event-establishment-condition storing unit is established. A task block stores control information for controlling the task.

A task-included event managing unit compares an event establishment condition stored in the event-establishment-condition storing unit with an occurred event. A task-included event-waiting managing unit transits a task that has been in a state of event waiting by a detecting function of the task-included event managing unit based on the control information stored in the task block into an event-waiting state, and stores the task that is transited into the event-waiting state in an event-waiting task storing unit. Then, at a time when an event-waiting releasing condition is established for the task in the event-waiting state, the task-included event-waiting managing unit transits the task into an execution-waiting state, and stores the task that is transited into the execution-waiting state in an execution-waiting task storing unit. A task managing unit selects one task from among a task that is under an execution by a current central processing unit (CPU), which is stored in an under-execution task storing unit, and an execution-waiting task that is stored in the execution-waiting task storing unit, and transits the selected task into an execution state.

In the conventional technology described above, the synchronized exclusive control is realized by setting up an execution condition to a task and controlling an order of execution of the task, when using an OS (a real-time OS) of the multiprogramming system.

However, a memory capacity of a product in which the embedded software is built is limited. Therefore, when a real-time OS is used to realize the synchronized exclusive control, as described in the conventional technology, a memory capacity that can be used for a program actually needed becomes small. This problem becomes more critical in a product in which a processor that executes the embedded software, a read only memory (ROM) that stores the embedded software, and a random access memory (RAM) that temporarily stores data necessary for executing the embedded software are implemented in one chip In addition, in the real-time OS, the synchronized exclusive control of the semaphore and the like can be realized by setting up a waiting state to a task. However, when tasks of different priorities share the semaphore, it may cause the priority to be reversed.

When a task of a low priority is taking the semaphore, a task of a high priority becomes in a waiting state. If a task of a mid priority occurs at this moment, which has a priority higher than the low priority and lower than the high priority, the task of the mid priority is executed prior to the task taking the semaphore. Then, the task of the high priority is finally executed after execution of the task taking the semaphore. In other words, the tasks are processed in a different order from the predetermined priority.

One of the possible methods to cope with the above problems can be developing an embedded software with only the interrupt processing, without using the real-time OS. However, if the embedded software is developed with only the interrupt processing without using the real-time OS, it is not possible to carry out the synchronized exclusive control. In addition, although it is possible to recognize an occurrence of the interrupt processing, it is not possible to recognize how many times the interrupt processing has occurred. Furthermore, when an interrupt occurs, the state must be held in a stack area, which causes the interrupt to be in a forbidden state during the time of holding the state in the stack area. As a result, the real-time property becomes deteriorated.

SUMMARY OF THE INVENTION

It is an object of the present invention to at least solve the problems in the conventional technology.

A real-time embedded simple monitor method according to one aspect of the present invention, which is for performing a scheduling of a plurality of interrupt service routines based on a semaphore structure and an interrupt-control-block sequence, includes interrupt-service-routine starting, scheduling, and interrupt-service-routine exiting. The interrupt-service-routine starting includes saving, when an interrupt occurs, a value of a program counter, a stack pointer that is a value of a stack register, and a context stored in a stack area at a time of the interrupt occurrence, in a context saving area of an interrupt control block corresponding to an interrupt service routine that is interrupted; and setting the interrupt control block corresponding to the occurred interrupt to an execution-waiting state. The scheduling includes selecting an interrupt control block having a highest priority from among the interrupt control blocks that are set to the execution-waiting state; saving a value of a program counter, a stack pointer, and a context stored in a context saving area of the selected interrupt control block, in the stack area; and executing an interrupt service routine selected by an interrupt return command. The interrupt-service-routine exiting includes setting, when exiting a process of the interrupt service routine executed at the scheduling, an interrupt control block corresponding to the exiting interrupt service routine to an interrupt-waiting state. The semaphore structure is applied to an embedded software configured with the interrupt service routines including a steady-state, is associated with a plurality of semaphores used for the interrupt service routines, and holds information on a usage state of the semaphores. In the interrupt-control-block sequence, plural interrupt control blocks holding information on a state of each of the interrupt service routines corresponding to interrupt levels of the interrupt service routines are connected in order of a priority of the interrupt level.

A real-time embedded simple monitor program according to another aspect of the present invention, which is for performing a scheduling of a plurality of interrupt service routines based on a semaphore structure and an interrupt-control-block sequence, causes a computer to execute the above method according to the present invention.

A computer-readable recording medium according to still another aspect of the present invention stores the real-time embedded simple monitor program according to the present invention.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of a real-time embedded monitor program according to the present invention will be explained in detail below with reference to the accompanying drawings. It should be noted that a scope of the present invention is not limited by the exemplary embodiments.

While the real-time embedded monitor program according to the present invention realizes a synchronized exclusive control without using a real-time OS, by setting up a state that becomes a waiting state, such as a task, to an interrupt processing, to make the explanation simple, the embodiments will be explained using terminology based on a specification of the μITRON that is one of the real-time OSs currently in use.

Figure 1:
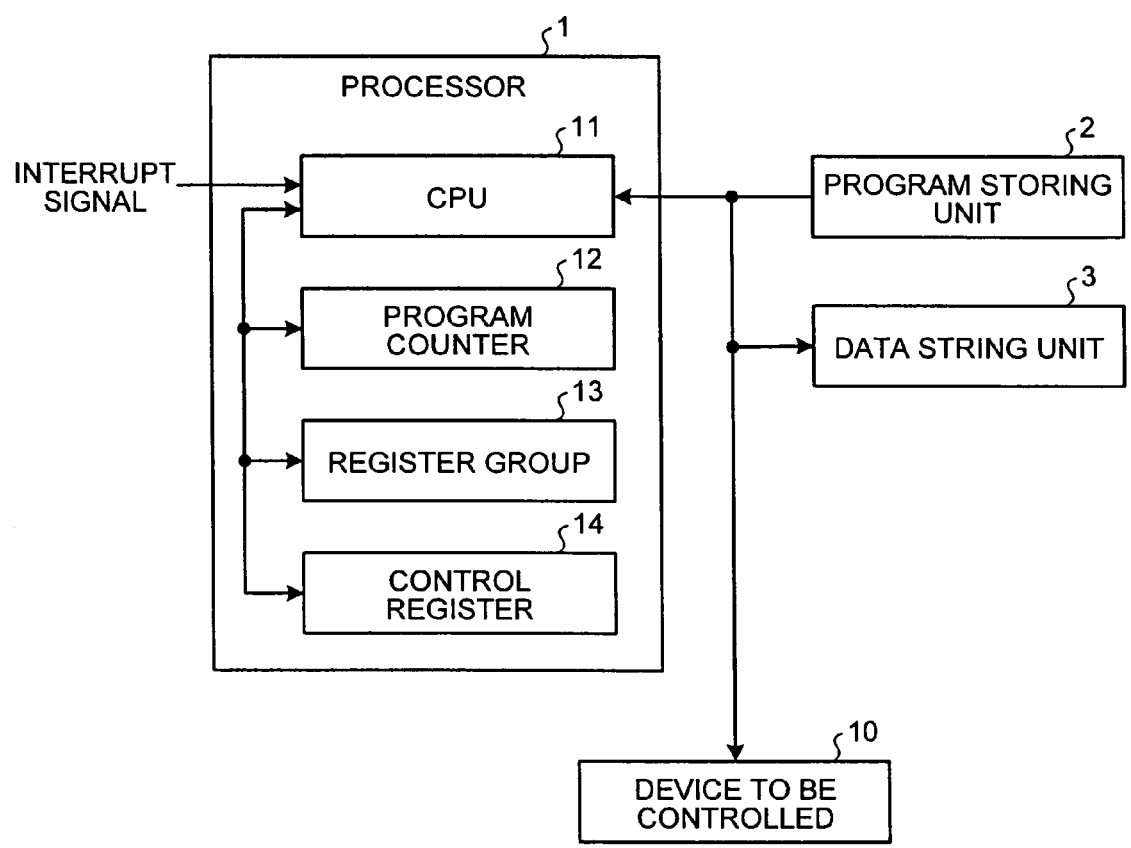
FIG. 1 is a schematic diagram for illustrating an example of configuration of an apparatus to which a real-time embedded simple monitor program according to the present invention is adapted.

FIG. 1 is a schematic diagram for illustrating an example of configuration of an apparatus to which a real-time embedded simple monitor program according to the present invention is adapted. The apparatus includes a processor 1, a program storing unit 2, a data storing unit 3, and a device to be controlled 10.

The program storing unit 2 is configured with a storage medium, such as a read only memory (ROM), and stores a user program executed by the processor 1 and fixed data required for the user program. The real-time embedded simple monitor program according to the present invention is used in the user program to realize a synchronized exclusive control.

The data storing unit 3 is configured with a writable storage medium, such as a random access memory (RAM), and stores a data buffer required for a stack area or the user program, and information required for the real-time embedded simple monitor program.

The processor 1 includes a central processing unit (CPU) 11, a program counter 12, a register group 13 including a universal register used for an operation process and a stack register storing a stack pointer, and a control register 14 storing control information for an interrupt signal.

The CPU 11 reads out a program code stored in an address indicated by the program counter 12 of the program storing unit 2, and controls the device to be controlled 10 by executing a predetermined operation process using the universal register of the register group 13 based on the program code read out. A plurality of interrupt signals (in this case, seven interrupt signals) that is input to the CPU 11 is provided from the device to be controlled 10 or outside. The control register 14 is configured with an interrupt flag indicating that an interrupt signal is generated (that an interrupt signal is asserted) and a mask flag for setting whether to mask the interrupt signal, for each of the interrupt signals.

If an interrupt signal is asserted when the mask flag of the control register 14 is set to OFF (which means that the interrupt signal is not masked), the CPU 11 stores a value of the program counter 12 that is currently being executed and a value of the stack register (stack pointer) in a stack area indicated by the stack pointer that is to be stored in the stack register. Then, the CPU 11 executes a program stored in an area indicated by an address that is determined in the program storing unit 2 in advance.

When the mask flag of the control register 14 is set to ON (the interrupt signal is masked so that the interrupt is prohibited), the CPU 11 continues to execute the program that is currently being executed, even if the interrupt signal is asserted. In this case, the CPU 11 carries out a predetermined interrupt process is carried out by checking the interrupt flag of the control register 14 in the user program, or receives an interrupt when the mask flag is set to OFF. It is assumed that the mask flag of the control register 14 is set to OFF in the following explanation.

Figure 2:
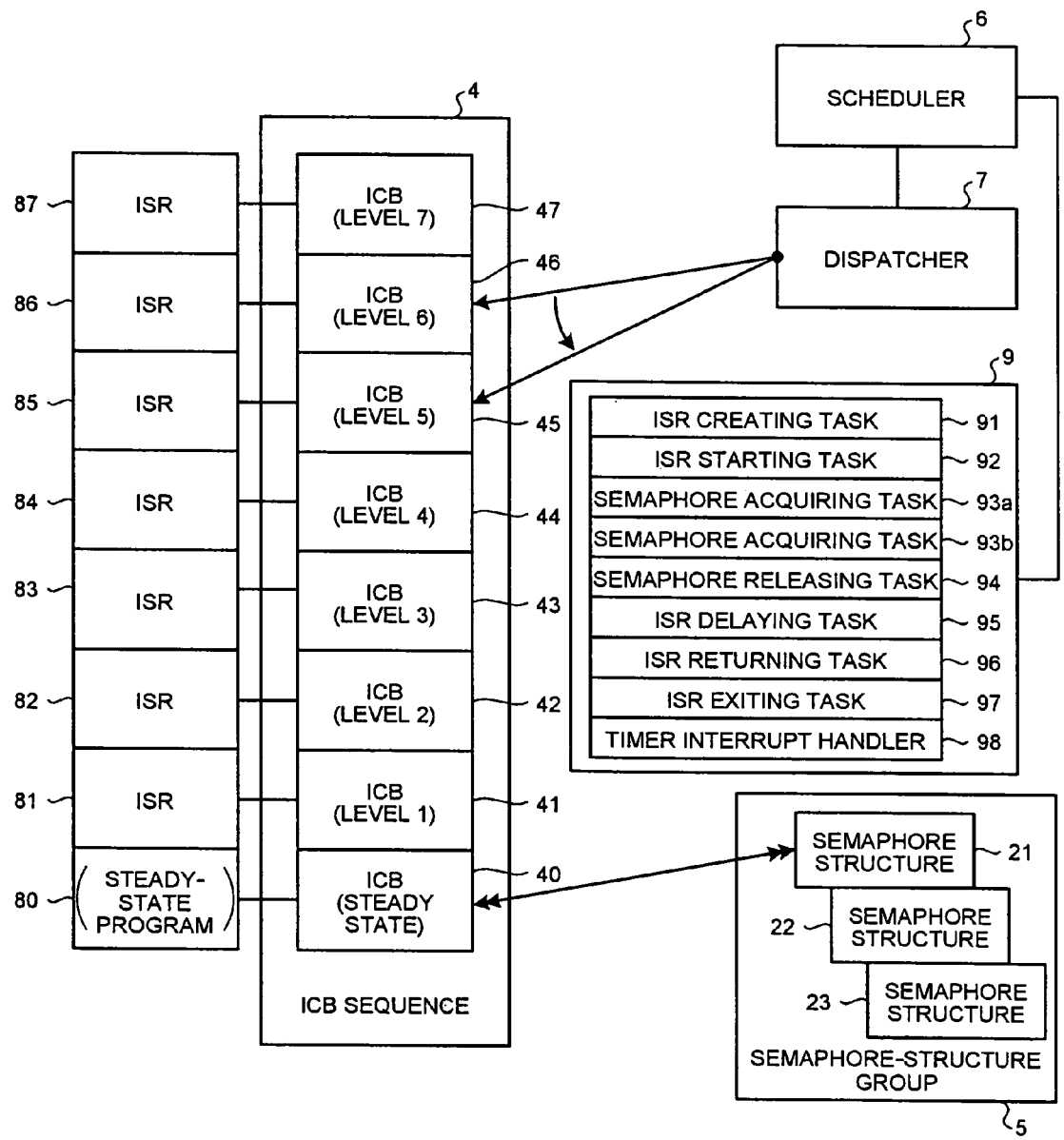
FIG. 2 is a schematic diagram of a real-time embedded simple monitor program according to a first embodiment of the present invention.

FIG. 2 is a schematic diagram of a real-time embedded simple monitor program according to a first embodiment of the present invention. The real-time embedded simple monitor program shown in FIG. 2 includes a plurality of interrupt service routines (ISRs) 81 to 87 and a stead-state program 80, an interrupt-control-block sequence (ICB sequence) 4, a scheduler 6 and a dispatcher 7, a semaphore-structure group 5, and a state-processing program 9. The ICB sequence 4 includes a plurality of interrupt control blocks (ICBs) 40 to 47 in which various pieces of information of the ISRs 81 to 87 and the steady-state program 80 are set. The schedule 6 carries out a scheduling of the ISRs 81 to 87 and the steady-state program 80 based on the ICB sequence 4 (an order of executing is determined, and the ISRs 81 to 87 and the steady-state program 80 to be executed is selected). A state of a semaphore used for the ISRs 81 to 87 and the steady-state program 80 is set in the semaphore-structure group 5. The state-processing program 9 carries out a state control for the ISRs 81 to 87 and the steady-state program 80.

A program for implementing functions of the ISRs 81 to 87, the steady-state program 80, the state-processing program 9, the scheduler 6, and the dispatcher 7 is stored in the program storing unit 2 shown in FIG. 1. The ICB sequence 4 and the semaphore-structure group 5 are stored in the data storing unit 3 shown in FIG. 1.

The ISRs 81 to 87 is a program for processing an interrupt by each of the interrupt signals input to the CPU 11. In this case, the ISR 81 is an interrupt-processing program with the lowest interrupt level (the lowest priority), and the ISR 87 is an interrupt-processing program with the highest interrupt level (the highest priority), from among the ISRs 81 to 87. In other words, the priority becomes higher in order of ISR 81, ISR 82, ISR 83, ISR 84, ISR 85, ISR 86, and ISR 87.

The steady-state program 80 is a processing program that is executed at a time of a non-interrupt state (steady state) in which a routine other than an interrupt processing by an interrupt signal is processed. The routine includes a routine for setting an initial value for the control register 14, the ICB sequence 4, and the semaphore-structure group 5, and a routine for creating the ISRs 81 to 87. When starting an apparatus in which the real-time embedded simple monitor program is installed (when turning a power of the apparatus on or when resetting a system), the steady-state program 80 is executed first.

The ICB sequence 14 includes the ICBs 40 to 47 that are corresponding to the steady-state program 80 and the ISRs 81 to 87, respectively. The real-time embedded simple monitor program according to the present invention realizes the synchronized exclusive control (scheduling) based on the ICBs 40 to 47. The steady-state program 80 that is executed in a non-interrupt state is handled as an ISR having an interrupt level (level 0) lower than that of the ISR 81 having the lowest interrupt level among the ISRs, and is associated with the ICB 40. In other words, the number of ICBs included in the ICB sequence 4 is "number of interrupt levels+1". For this reason, in some parts of the specification, the steady-state program 80 is referred to as ISR 80.

The ICBs 40 to 47 has a structure connected in sequence, and an order of the-sequence indicates the priority in scheduling the ISRs 80 to 87. In this example, because the interrupt level becomes low in order of ISR 87, ISR 86, ISR 85, ISR 84, ISR 83, ISR 82, ISR 81, and ISR 80, the order of connection sequence becomes TCB 47, ICB 46, ICB 45, ICB 44, ICB 43, ICB 42, ICB 41, and ICB 40. This connection sequence indicates the priority of the ISRs 80 to 87 (searching order of the ICBs 40 to 47 by the dispatcher 7). The information on the connection is stored in the data storing unit 3.

Figure 3:
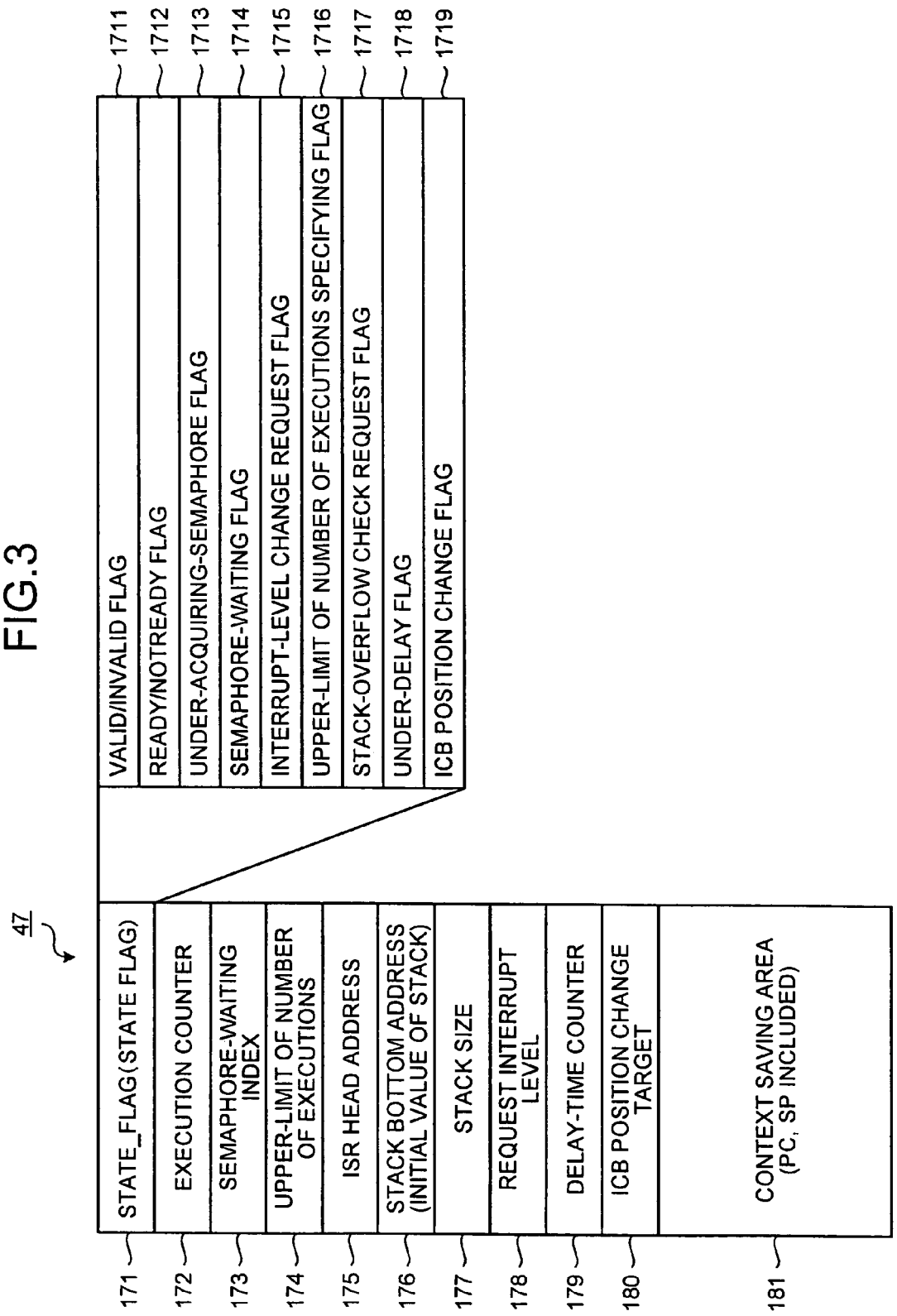
FIG. 3 is a schematic diagram for illustrating a configuration of an ICB shown in FIG. 2.

All of the ICBs 40 to 47 has the same configuration. FIG. 3 is a schematic diagram for illustrating the configuration of the ICB shown in FIG. 2.

As shown in FIG. 3, the ICB 47 is configured with a state flag 171, an execution counter 172, a semaphore-waiting index 173, an upper-limit of number of executions 174, an ISR head address 175, a stack bottom address 176, a stack size 177, a request interrupt level 178, a delay-time counter 179, an ICB position change target 180, and a context saving area 181.

The state flag 171 is a set of flags indicating a state of the ICB 47, and is configured with a valid/invalid flag 1711, a ready/notready flag 1712, an under-acquiring-semaphore flag 1713, a semaphore-waiting flag 1714, an interrupt-level change request flag 1715, an upper-limit of number of executions specifying flag 1716, a stack-overflow check-request flag 1717, an under-delay flag 1718, and an ICB position change flag 1719.

In the valid/invalid flag 1711, information on whether the ISR 87 is available, i.e., whether to make the ISR 87 a target of the scheduling, is set. When the ISR 87 is available, ON (in this case, "1") is set to the valid/invalid flag 1711. When the ISR 87 is not available, OFF (in this case, "0") is set to the valid/invalid flag 1711.

In the ready/notready flag 1712, information on whether the ISR 87 is in an interrupt-waiting state is set. When the ISR 87 is in the interrupt-waiting state, OFF (in this case, "0") is set to the ready/notready flag 1712. When the ISR 87 is not in the interrupt-waiting state, ON (in this case, "1") is set to the ready/notready flag 1712.

In the under-acquiring-semaphore flag 1713, information on whether the ISR 87 acquired an arbitrary semaphore is set. When the ISR 87 acquired the arbitrary semaphore, ON (in this case, "1") is set to the under-acquiring-semaphore flag 1713. When the ISR 87 did not acquire the arbitrary semaphore, OFF (in this case, "0") is set to the under-acquiring-semaphore flag 1713.

In the semaphore-waiting flag 1714, information on whether the ISR 87 is in a waiting state for an arbitrary semaphore is set. When the ISR 87 is in the waiting state for the arbitrary semaphore, ON (in this case, "1") is set to the semaphore-waiting flag 1714. When the ISR 87 is not in the waiting state for the arbitrary semaphore, OFF (in this case, "0") is set to the semaphore-waiting flag 1714.

In the interrupt-level change request flag 1715, information on whether to change an interrupt level determined in advance is set. When operating with the interrupt level determined in advance (when receiving an interrupt having a higher priority only), OFF (in this case, "0") is set to the interrupt-level change request flag 1715. When operating with the interrupt level set in the request interrupt level 178, ON (in this case, "1") is set to the interrupt-level change request flag 1715.

In the upper-limit of number of executions specifying flag 1716, information on whether to limit the number of executions of the ISR 87 when an interrupt to be processed by the ISR 87 occurred a plurality of times is set. When not limiting the number of executions (when executing the ISR 87 as many times as the number of occurrence of the interrupt), OFF (in this case, "0") is set to the upper-limit of number of executions specifying flag 1716. When limiting the number of executions, ON. (in this case, "1") is set to the upper-limit of number of executions specifying flag 1716.

In the stack-overflow check request flag 1717, information on whether an overflow occurred in the context saving area 181 is set. When the overflow did not occur in the context saving area 181 (normal state), OFF (in this case, "0") is set to the stack-overflow check request flag 1717. When the overflow occurred in the context saving area 181 (abnormal state), ON (in this case, "1") is set to the stack-overflow check request flag 1717.

In the under-delay flag 1718, information on whether the ISR 87 is in an execution suspending state (delay executing state) is set. When the ISR 87 is in the execution suspending state, ON (in this case, "1") is set to the under-delay flag 1718. When the ISR 87 is not in the execution suspending state, OFF (in this case, "0") is set to the under-delay flag 1718.

In the ICB position change flag 1719, information on whether a position of the ICB 47 is changed is set. As describe above, the ICBs 40 to 47 are connected according to the interrupt level determined in advance. Therefore, in the ICB position change flag 1719, information on whether the connection position is changed for a process to avoid an inverse of the priority or the like, i.e., the priority of the scheduling is changed to an order that is different from the interrupt level, is set. When the position is not changed, OFF (in this case, "0") is set to the ICB position change flag 1719. When the position is changed, ON (in this case, "1") is set to the ICB position change flag 1719.

In the execution counter 172, the number of times to execute the ISR 87, i.e., the number of occurrence of an interrupt handler that activates the ISR 87, is set. When ON is set to the upper-limit of number of executions 174, a value set to the execution counter 172 becomes within a value set in the upper-limit of number of executions 174.

In the semaphore-waiting index 173, an index (an identifier for identifying a semaphore under acquiring waiting) of a semaphore for which the ISR 87 is in an acquiring waiting is set. The value of the semaphore-waiting index 173 is valid only when ON is set to the semaphore-waiting flag 1714.

In the upper-limit of number of executions 174, an upper-limit value of the number of times to execute the ISR 87, i.e., an upper-limit value set in the execution counter 172 is set. The value of the upper-limit of number of executions 174 is valid only when ON is set to the upper-limit of number of executions specifying flag 1716.

In the ISR head address 175, a head address of an area of the program storing unit in which the ISR 87 is stored is set.

In the stack bottom address 176, an initial value of the context saving area 181 (address with which data is stored first in the context saving area 181 of the data storing unit 3) is set. In the stack size 177, a size of the context saving area 181, i.e., a memory size of the context saving area 181 of the data storing unit 3, is set.

Data set in the stack bottom address 176 and the stack size 177 are used to check if the context saving area 181 overflows. When an overflow is detected, "ON" is set to the stack-overflow check request flag 1717. A task to check the overflow is activated in the ISRs 80 to 87.

In the request interrupt level 178, a value indicating an interrupt level with which an interrupt is allowed when the ISR 87 is in an execution state is set. The value of the request interrupt level 178 is valid only when ON is set to the interrupt-level change request flag 1715.

For example, because the ISR 87 has the interrupt level 7, the ISRs 80 to 86 cannot interrupt when OFF is set to the interrupt-level change request flag 1715. However, when ON is set to the interrupt-level change request flag 1715, and if the value of the request interrupt level 178 is "3", the ISRs 83 to 86 having the interrupt levels 3 to 6, respectively, are allowed to interrupt.

In the delay-time counter 179, a remaining time for which the ISR 87 delays, i.e., a time from an execution suspending state to a return of the ISR 87, is set. The value of the delay-time counter 179 is valid only when ON is set to the under-delay flag 1718.

In the ICB position change target 180, information on the ISRs 80 to 87 of a change target is set, when a position of the ICB 47 is changed. The value of the ICB position change target 180 is valid only when ON is set to the ICB position change flag 1719.

In the context saving area 181, a context required for returning to a state at a time when an interrupt occurred from the ISR 87, such as the program counter 12 and the register group 13, is set.

Figure 4:
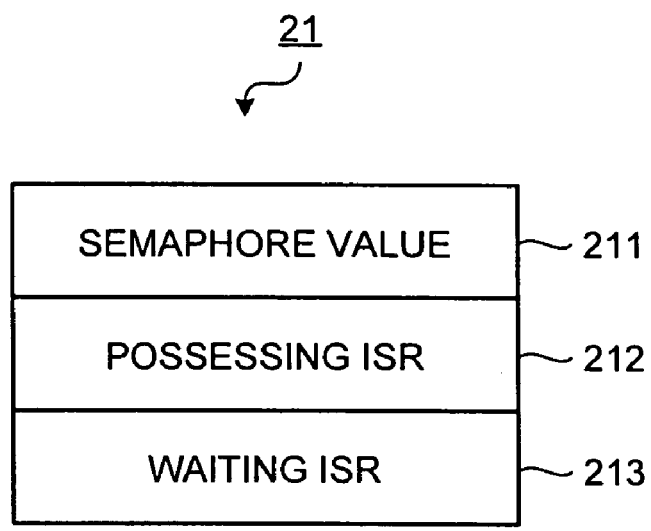
FIG. 4 is a schematic diagram for illustrating a configuration of a semaphore structure shown in FIG. 2.

Referring back to FIG. 2, the semaphore-structure group 5 is configured with semaphore structures 21 to 23 as many as the number of semaphores used by the ISRs 80 to 87 (in this case, "3"). All of the semaphores structures 21 to 23 has the same configuration. FIG. 4 is a schematic diagram for illustrating the configuration of the semaphore structure shown in FIG. 2.

The semaphore structure 21 is configured with a semaphore value 211, a possessing ISR 212, and a waiting ISR 213. In the semaphore value 211, remaining number of semaphores corresponding to the semaphore structure 21 are is set. When the initial value of the semaphore value 211 is "3" (the number of semaphore under control is "3"), if the value of the semaphore value 211 is "3", it means that the semaphores under control are not acquired by the ISRs 80 to 87. When the value of the semaphore value 211 is "2", it means that one of the semaphores under control is acquired by any one of the ISRs 80 to 87. When the value of the semaphore value 211 is "1", it means that two of the semaphores under control are acquired by any one of the ISRs 80 to 87. When the value of the semaphore value 211 is "0", it means that all of the semaphores under control is acquired by any one of the ISRs 80 to 87 (there is no semaphore remaining), so that the ISRs 80 to 87 cannot acquire a semaphore.

In the possessing ISR 212, an ISR identifier for identifying the ISRs 80 to 87 that acquired the semaphore that is managed by the semaphore structure 21 is set. The ISR identifier can be granted to the ISRs 80 to 87 in advance. Furthermore, a head address in which the program storing unit 2 stores the ISRs 80 to 87 or an interrupt level that is determined in advance can also be used for the ISR identifier.

The possessing ISR 212 operates at the same time as the semaphore value 211, and a total of the semaphore value 211 and the number of the ISRs 80 to 87 that are set in the possessing ISR 212 is equal to the number of the semaphores that are managed by the semaphore structure 21. When the value of the semaphore value 211 is "initial value–1", one ISR identifier is set in the possessing ISR 212.

In the waiting ISR 213, an ISR identifier for identifying the ISRs 80 to 87 that are in a state of waiting for acquiring the semaphore that is managed by the semaphore structure 21. When the ISR identifier is set in the waiting ISR 213, the value of the semaphore value 211 is, "0", and the ISR identifiers as many as the number of the semaphore that are managed by the semaphore structure 21 are set in the possessing ISR 212.

The real-time embedded simple monitor program according to the present invention realizes the synchronized exclusive control by giving a state waiting, such as a task, to the ISRs 80 to 87 using the ICB sequence 4 and the semaphore-structure group 5, and the ISRs 80 to 87 have a plurality of states. The state-processing program 9 is a program for transiting the state of the ISRs 80 to 87, being configured with an ISR creating task 91, an ISR starting task 92, a semaphore-acquiring task 93a, a semaphore-acquiring task 93b, a semaphore-releasing task 94, an ISR delaying task 95, an ISR returning task 96, an ISR exiting task 97, and a timer interrupt handler 98.

Each of the tasks 91 to 97 and the timer interrupt handler 98 are used for the ISRs 80 to 87 that are created by a user, and cause a state of corresponding task to transit with the scheduler 6 and the dispatcher 7. Functions of each of the tasks 91 to 97, the timer interrupt handler 98, the scheduler 6, and the dispatcher 7, and a state of the ISRs 80 to 87 will be explained with reference to FIG. 5.

Figure 5:
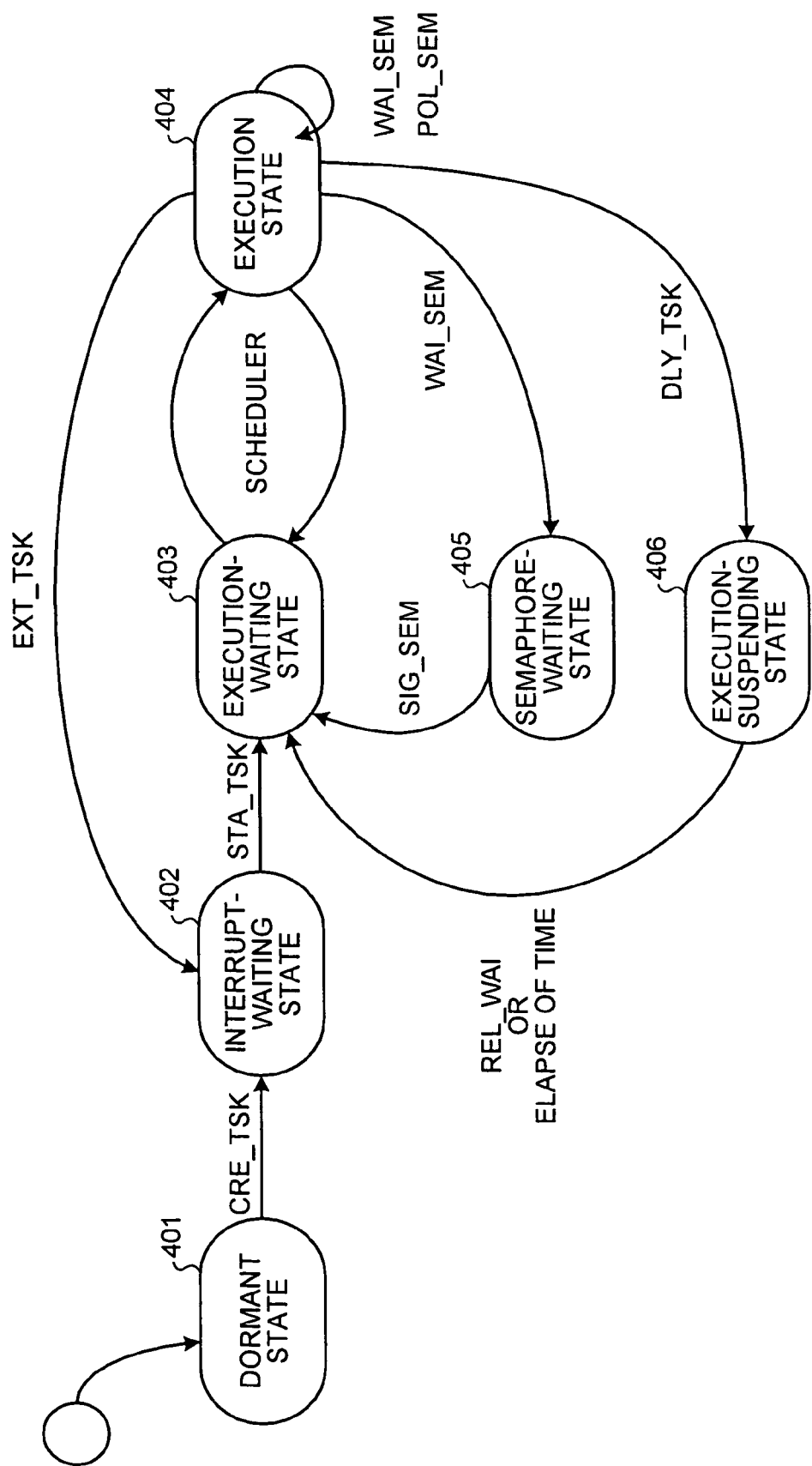
FIG. 5 is a schematic diagram for illustrating a transition of a state of an ISR shown in FIG. 2.

FIG. 5 is a schematic diagram for illustrating a transition of a state of an ISR shown in FIG. 2. Each of the ISRs 80 to 87 includes six states of a dormant (dormnt) state 401, an interrupt-waiting (notready) state 402, an execution-waiting (ready) state 403, an execution (running) state 404, a semaphore-waiting (sem_wait) state 405, and an execution-suspending (sleep) state 406.

In the dormant state 401, the ISRs 80 to 87 just exist in the program storing unit 2 as command codes, but they are not available. When the ISRs 80 to 87 are in the dormant state 401, because the ISRs 80 to 87 cannot be used, "0" is set to the valid/invalid flag 1711 of the ICBs 40 to 47 (see FIG. 3), and when an interrupt corresponding to the ISRs 80 to 87 occurs, it becomes an error. In the dormant state 401, an ISR creating task (cre_tsk) can only be executed.

The ISR creating task 91 set "1" to the valid/invalid flag 1711 of the ICBs 40 to 47 corresponding to the ISRs 80 to 87 to be created, to transit the state of the ISRs 80 to 87 from the dormant state 401 into the interrupt-waiting state 402. In addition, the ISR creating task 91 carries out an initial setting of the ICBs 40 to 47 to make the ISRs 80 to 87 that are necessary for realizing a function desired by a user available.

The interrupt-waiting state 402 is a state transited from the dormant state 401 (the ISR creating task 91 has been executed), or a state in which no interrupt has occurred, so that the ISRs 80 to 87 are not executed. States that can be transited into the interrupt-waiting state 402 are the dormant state 401, the execution state 404, the semaphore-waiting state 405, and the execution-suspending state 406. when the ISRs 80 to 87 are in the interrupt-waiting state 402, "0" is set to the ready/notready flag 1712 of the ICBs 40 to 47 (see FIG. 3).

The ISR starting task (sta_tsk) 92 transits the state of the ISRs 80 to 87 from the dormant state 401 into the interrupt-waiting state 402. The ISR starting task 92 is an interrupt handler that is executed by the CPU 11 when an interrupt corresponding to the ISRs 80 to 87 has occurred. The ISR starting task 92 sets "1" to the ready/notready flag 1712 of the ICBs 40 to 47 corresponding to the interrupt occurred, and at the same time, initializes the ICBs 40 to 47.

The interrupt-waiting state 402 is a state of waiting for an interrupt process, i.e., an execution of the ISRs 80 to 87, caused by the occurrence of the interrupt corresponding to the ISRs 80 to 87. When the ISRs 80 to 87 are in the interrupt-waiting state 402, "1" is set to the ready/notready flag 1712 of the ICBs 40 to 47.

The scheduler 6 and the dispatcher 7 selects the ISRs 80 to 87 to be executed, i.e., the ISRs 80 to 87 having the highest priority, from among the ISRs 80 to 87 in the interrupt-waiting state 402, based on the ICBs 40 to 47, and transits the state of the ISRs 80 to 87 into the execution state 404 by transferring a process to the selected ISRs 80 to 87.

When a process is transferred (started) from the ISR starting task 92, the semaphore-acquiring task 93a, the semaphore-releasing task 94, the ISR delaying task 95, the ISR returning task 96, the ISR exiting task 97, or the timer interrupt handler 98, the scheduler 6 determines whether to execute the ISRs 80 to 87 based on the execution counter 172 of the ICBs 40 to 47 corresponding to the ISRs 80 to 87 that executed the tasks 92, 93a, and 94 to 97, or the timer interrupt handler 98 (see FIG. 3). When it is determined that the ISRs 80 to 87 should be executed, the scheduler 6 transfers the process to the dispatcher 7.

The dispatcher 7 determines whether "1" is set to the ready/notready flag 1712 from the head of the ICBs 40 to 47 in order, selects the ISRs 80 to 87 corresponding to the ICBs 40 to 47 in which "1" is set to the ready/notready flag 1712 first, and transits the state into the execution state 404 by transferring the process to the selected ISRs 80 to 87. The execution state 40 is a state in which the process of the ISRs 80 to 87 is executed.

The semaphore-acquiring tasks (wai_sem, pol_sem) 93a and 93b are started when the ISRs 80 to 87 in the execution state 404 acquires an arbitrary semaphore, and acquires a semaphore based on the semaphore structures 21 to 23. The semaphore-acquiring task 93a returns to the starting source (an address next to the calling source) when it succeeded in acquiring the semaphore. Otherwise, the semaphore-acquiring task 93a transits the state of the ISRs 80 to 87 into the semaphore-waiting state 405. On the other hand, the semaphore-acquiring task 93b returns to the address next to the calling source with information on whether it succeeded in acquiring the semaphore, without transiting the state of the ISRs 80 to 87 into the semaphore-waiting state 405.

The semaphore waiting state 405 is a state in which the semaphore could not be acquired when the ISRs 80 to 87 tried to acquire the semaphore using the semaphore-acquiring task 93a, i.e., "0" is set to the semaphore value 211 of the semaphore structures 21 to 23 corresponding to the semaphore to be acquired (see FIG. 4), the ISR identifiers as many as the number of the semaphores are set to the possessing ISR 212, and at least one ISR identifier is set to the waiting ISR 213.

The semaphore-releasing task (sig_sem) 94 is used when the ISRs 80 to 87 are in the execution state 404 and the semaphore acquired by the semaphore-acquiring tasks 93a and 93b is to be released, and transits the state of the ISRs 80 to 87 in the semaphore-waiting state 405 into the execution-waiting state 403. When transiting the state of the ISRs 80 to 87 in the semaphore-waiting state 405 into the execution-waiting state 403, the semaphore-releasing task 94 sets "0" to the semaphore-waiting flag 1714 of the ICBs 40 to 47 corresponding to the ISRs 80 to 87 of which the state is to be transited.

The ISR delaying task (dly_tsk) 95 is a task started when the ISRs 80 to 87 are in the execution state 404 and when stopping the execution of the ISRs 80 to 87, and transits the state of the ISRs 80 to 87 from the execution state 404 into the execution-suspending state 406.

In the execution-suspending state 406, the execution of the ISRs 80 to 87 is suspended, and "1" is set to the under-delay flag 1718 of the ICBs 40 to 47. The execution-suspending state 406 is transited into the execution-waiting state 403 by the ISR returning task 96 or a elapse of a predetermined time (the timer interrupt handler 98).

The ISR returning task 96 sets "OFF" to the under-delay flag 1718 of the ICBs 40 to 47 corresponding to the ISRs 80 to 87 that are to be returned, sets "ON" to the ready/notready flag 1712, and initializes the value of the delay-time counter 179, to forcibly transit the state of the ISRs 80 to 87 to be returned from the execution-suspending state 406 into the execution-waiting state 403 before a delay time passes.

The timer interrupt handler 98 is started whenever a count value of a timer (not shown) in the processor 1 is changed, and changes the value of the delay-time counter 179 of the ICBs 40 to 47. The timer interrupt handler 98 sets "0" to the under-delay flag 1718 of the state flag 171 of the ICBs 40 to 47 when the value of the delay-time counter 179 of the ICBs 40 to 47 becomes "0", and at the same time, sets "1" to the ready/notready flag 1712, to transit the state of the ISRs 80 to 87 from the execution-suspending state 406 into the execution-waiting state 403.

The ISR exiting task (ext_tsk) 97 is started at the time of terminating the ISRs 80 to 87, terminates the ISRs 80 to 87 based on the value of the execution counter 172 of the ICBs 40 to 47 corresponding to the running ISRs 80 to 87, and transits the state of the ISRs 80 to 87 from the execution state 404 into the interrupt-waiting state 402.

An operation of the real-time embedded simple monitor program according to the present invention will be explained with reference to FIGS. 6 to 16. When executing each of the tasks 91 to 97 and the timer interrupt handler 98, the CPU 11 is supposed to store a value of the program counter 12 and a stack pointer that is a value of a stack register in the register group 13 in a stack area. In addition, an interrupt-prohibiting state is supposed to be released when returning to an address next to a calling source (starting source). Furthermore, the ICBs 40 to 47 are supposed to be initialized at the time of turning a power on or by a system reset from the outside.

Figure 6:
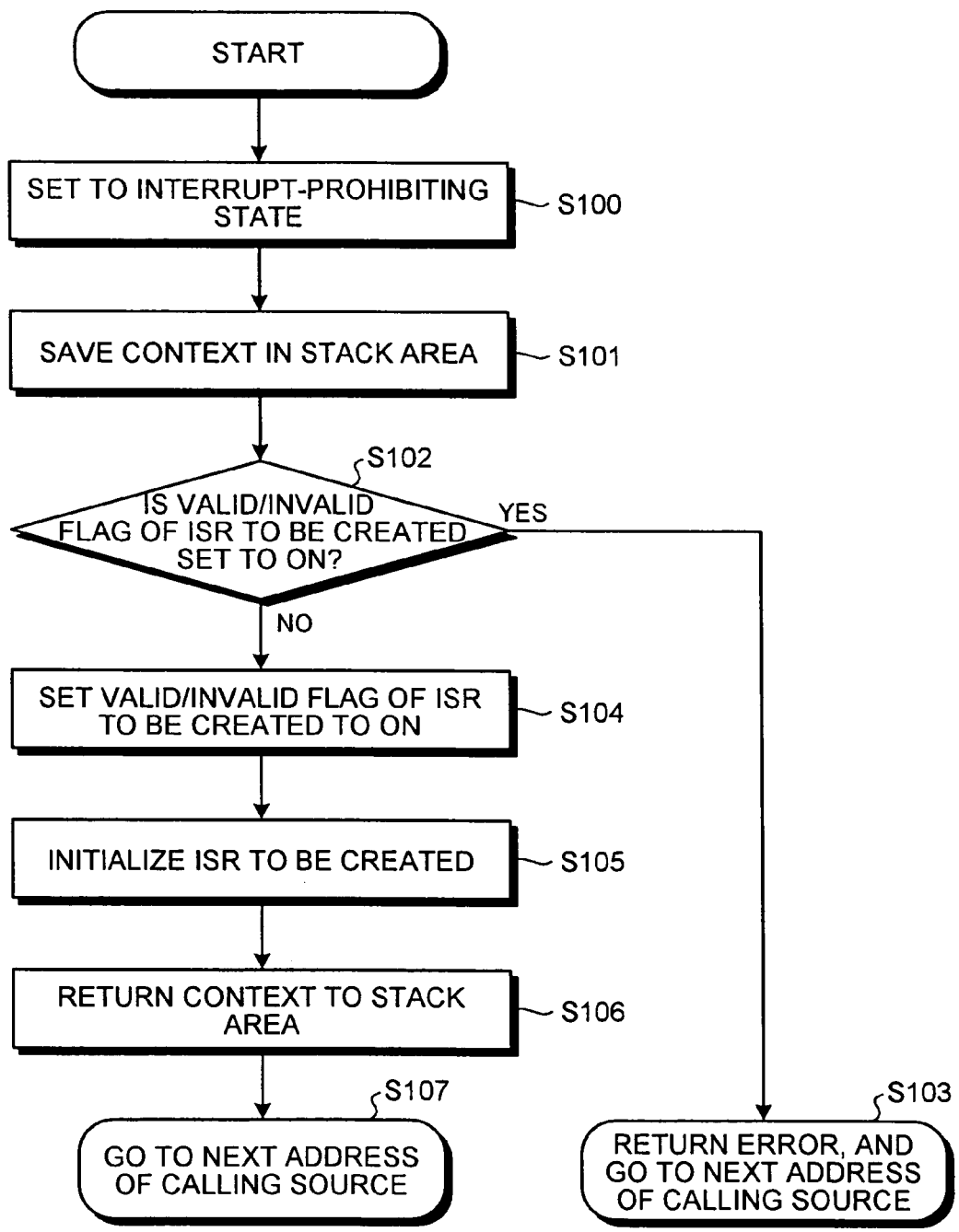
FIG. 6 is a flowchart of a processing procedure for an operation of a start-up ISR creating task according to the first embodiment.

FIG. 6 is a flowchart of a processing procedure for an operation of the ISR creating task 91 that transits the state of the ISRs 80 to 87 from the dormant state 401 into the interrupt-waiting state 402 as shown in FIG. 5.

The ISR creating task 91 sets the operation mode of the CPU 11 to the interrupt-prohibiting state (Step S100). In other words, the ISR creating task 91 sets "ON" to all mask flags for every interrupt signals of the control register 14.

The ISR creating task 91 saves (stores) a context in the stack area (Step S101). Because the ISR creating task 91 is started from the steady-state program 80, it returns to the steady-state program 80 (returns to an address next to the calling source), and saves the context, such as a value of a universal register required for continuing a process before starting the ISR creating task 91, in the stack area. A place of the stack area in which the context is stored is determined using a value of the stack pointer just like a typical program.

Hereinafter, the context stored in the stack area, the value of the program counter 12 that is stored in the stack area by the CPU 11 when the ISRs 80 to 87 starts each of the tasks 91 to 97 or the timer interrupt handler 98, and the stack pointer that is a value of the stack register in the register group 13 are referred to as a processor context, and the register group 13 except for the stack register and data required for returning of the program except for the value of the program counter 12 are referred to as the context.

The ISR creating task 91 checks if "ON" is set to the valid/invalid flag 1711 of the state flag 171 of the ICBs 40 to 47 corresponding to the ISRs 80 to 87 to be created (in this case, "1") (Step S102).

When "ON" is set to the valid/invalid flag 1711, it indicates that the ISRs 80 to 87 to be created has been already created. Because the ISR creating task 91 is a task that is started for creating the ISRs 80 to 87 to be created, the fact that the ISRs 80 to 87 are already created ("ON" is set to the valid/invalid flag 1711) means that an error has occurred in the program. Therefore, the ISR creating task 91 returns an error (a code indicating an ISR creating error), and returns to the address next to the calling source (Step S103).

On the other hand, when "OFF" is set to the valid/invalid flag 1711 (in this case, "0"), the ISR creating task 91 sets "ON" to the valid/invalid flag 1711 of the ICBs 40 to 47 corresponding to the ISRs 80 to 87 to be created, and at the same time, initializes the ICBs 40 to 47 (Steps S104, S105).

In other words, the ISR creating task 91 sets "1" to the valid/invalid flag 1711 of the ICBs 40 to 47 corresponding to the ISRs 80 to 87 to be created, and sets "0" to the ready/notready flag 1712, the under-acquiring-semaphore flag 1713, the semaphore-waiting flag 1714, the interrupt-level change request flag 1715, the under-delay flag 1718, and the ICB position change flag 1719.

When changing an interrupt level that is determined in advance, the ISR creating task 91 sets "1" to the interrupt-level change request flag 1715, and at the same time, sets an interrupt level to receive a request to the request interrupt level 178. On the other hand, when not changing the interrupt level, the ISR creating task 91 sets "0" to the interrupt-level change request flag 1715.

When setting an upper limit of the number of executions, the ISR creating task 91 sets "1" to the upper-limit of number of executions specifying flag 1716, and at the same time, sets the upper limit of the number of executions to the upper-limit of number of executions 174. On the other hand, when not setting the upper limit of the number of executions (when executing the ISRs 80 to 87 as many times as the number of occurrence of the interrupt), the ISR creating task 91 sets "0" to the upper-limit of number of executions specifying flag 1716.

In addition, when checking an stack overflow, the ISR creating task 91 sets "1" to the stack-overflow check request flag 1717, and when not checking the stack overflow, the ISR creating task 91 sets "0" to the stack-overflow check request flag 1717.

The ISR creating task 91 sets an address of the program storing unit 2 in which a head code of the ISRs 80 to 87 corresponding to the ICBs 40 to 47 is stored to the ISR head address 175, sets an initial value of the context saving area 181 to the stack bottom address 176, and sets a size of the context saving area 181 to the stack size 177.

Furthermore, the ISR creating task 91 sets a value set to the program address and a value of the stack pointer of the context saving area 181 to the context saving area 181.

After initializing the ICBs 40 to 47 corresponding to the ISRs 80 to 87 to be created, the creating flag returns the context saved in the stack area (returns the value of the universal register or the like to a state before starting the creating task), and returns to the address next to the calling source (Steps S106, S107).

Figure 7:
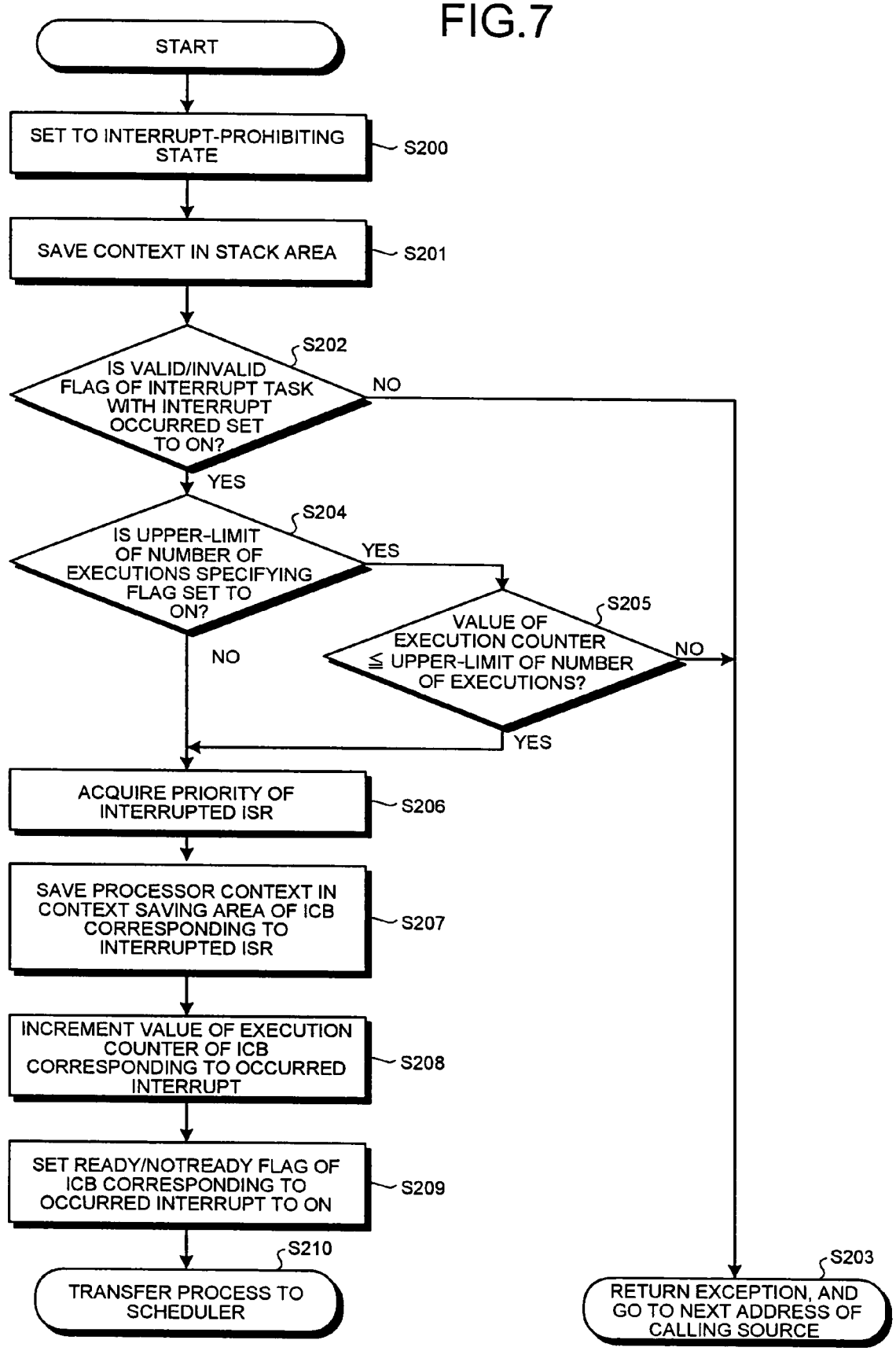
FIG. 7 is a flowchart of a processing-procedure for an operation of an ISR starting task according to the first embodiment.

FIG. 7 is a flowchart of a processing procedure for an operation of the ISR starting task 92. The ISR starting task 92 sets the operation mode of the CPU 11 to the interrupt-prohibiting state, and saves the context in the stack area (Step S200, S201).

The ISR starting task 92 checks if "ON" is set to the valid/invalid flag 1711 of the ICBs 40 to 47 corresponding to the interrupt that started the ISR starting task 92 (interrupt has occurred) (Step S202).

When "OFF" is set to the valid/invalid flag 1711, because the ISRs 80 to 87 corresponding to the occurred interrupt is not created, the ISR starting task 92 returns an exception (a code indicating that the corresponding ISRs 80 to 87 are not created, but the ISR starting task 92 is started), and returns to the address next to the calling source (Step S203).

When "ON" is set to the valid/invalid flag 1711 of the ICBs 40 to 47 corresponding to the occurred interrupt, the starting flag determines whether "ON" is set to the upper-limit of number of executions specifying flag 1716 (Step S204).

When "ON" is set to the upper-limit of number of executions specifying flag 1716, the ISR starting task 92 compares a value set in the execution counter 172 of the ICBs 40 to 47 corresponding to the occurred interrupt with a value set in the upper-limit of number of executions 174 (Step S205).

When the value set in the execution counter 172 is larger than the value set in the upper-limit of number of executions 174, the ISR starting task 92 returns an exception (a code indicating that the ISR starting task 92 has been started over the upper-limit of number of executions), and returns to the address next to the calling source (Step S203).

On the other hand, when the value set in the execution counter 172 is equal to or smaller than the value set in the upper-limit of number of executions 174, or when "OFF" is set to the upper-limit of number of executions specifying flag 1716, the ISR starting task 92 acquires a priority of the ISRs 80 to 87 that were interrupted (that were being executed before executing the ISR starting task 92) (Step S206).

The priority of the ISRs 80 to 87 that were interrupted (that were being executed before executing the ISR starting task 92) is set in an area of an interrupt task memo of the data storing unit 3 by a process of the dispatcher 7. The ISR starting task 92 acquires the priority of the ISRs 80 to 87 that were interrupted (that were being executed before executing the ISR starting task 92) by reading out data from the area of the interrupt task memo. The interrupt task memo is an area of the data storing unit 3 that holds information on the ISRs 80 to 87 currently being executed. The information on the ISRs 80 to 87 currently being executed is stored by the dispatcher 7.

The ISR starting task 92 saves the processor context stored in the stack area in the context saving area 181 of the ICBs 40 to 47 corresponding to the ISRs 80 to 87 that were interrupted (Step S207). In other words, the ISR starting task 92 copies and saves the value of the program counter 12 and the stack pointer stored in the stack area by the CPU 11 when the own task was started, and the context saved in the stack area by the own task at Step S201 to the context saving area 181 of the ICBs 40 to 47 corresponding to the ISRs 80 to 87 that were being executed before starting the own task.

The ISR starting task 92 adds "1" to the value of the execution counter 172 of the ICBs 40 to 47 corresponding to the occurred interrupt (increment the execution counter) (Step S208). Then, the ISR starting task 92 sets "ON" to the ready/notready flag 1712 of the ICBs 40 to 47 corresponding to the occurred interrupt (in this case, "1"), and transfers the process to the scheduler 6 (Steps S209, S210).

Figure 8:
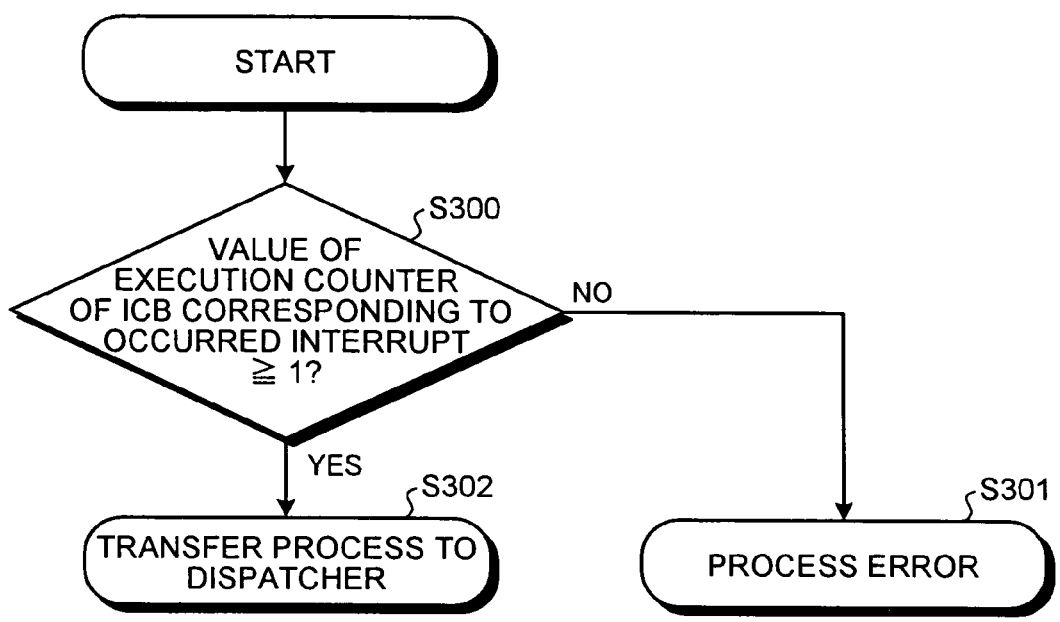
FIG. 8 is a flowchart of a processing procedure for an operation of a scheduler according to the first embodiment.

FIG. 8 is a flowchart of a processing procedure for an operation of the scheduler 6. The scheduler 6 determines whether the value of the execution counter 172 of the ICBs 40 to 47 corresponding to the occurred interrupt is equal to or larger than "1" (Step S300). When the value of the execution counter 172 of the ICBs 40 to 47 corresponding to the occurred interrupt is smaller than "1", the scheduler 6 executes an error process (Step S301). On the other hand, when the value of the execution counter 172 of the ICBs 40 to 47 corresponding to the occurred interrupt is equal to or larger than "1", the scheduler 6 transfers the process to the dispatcher 7 (Step S302).

Figure 9:
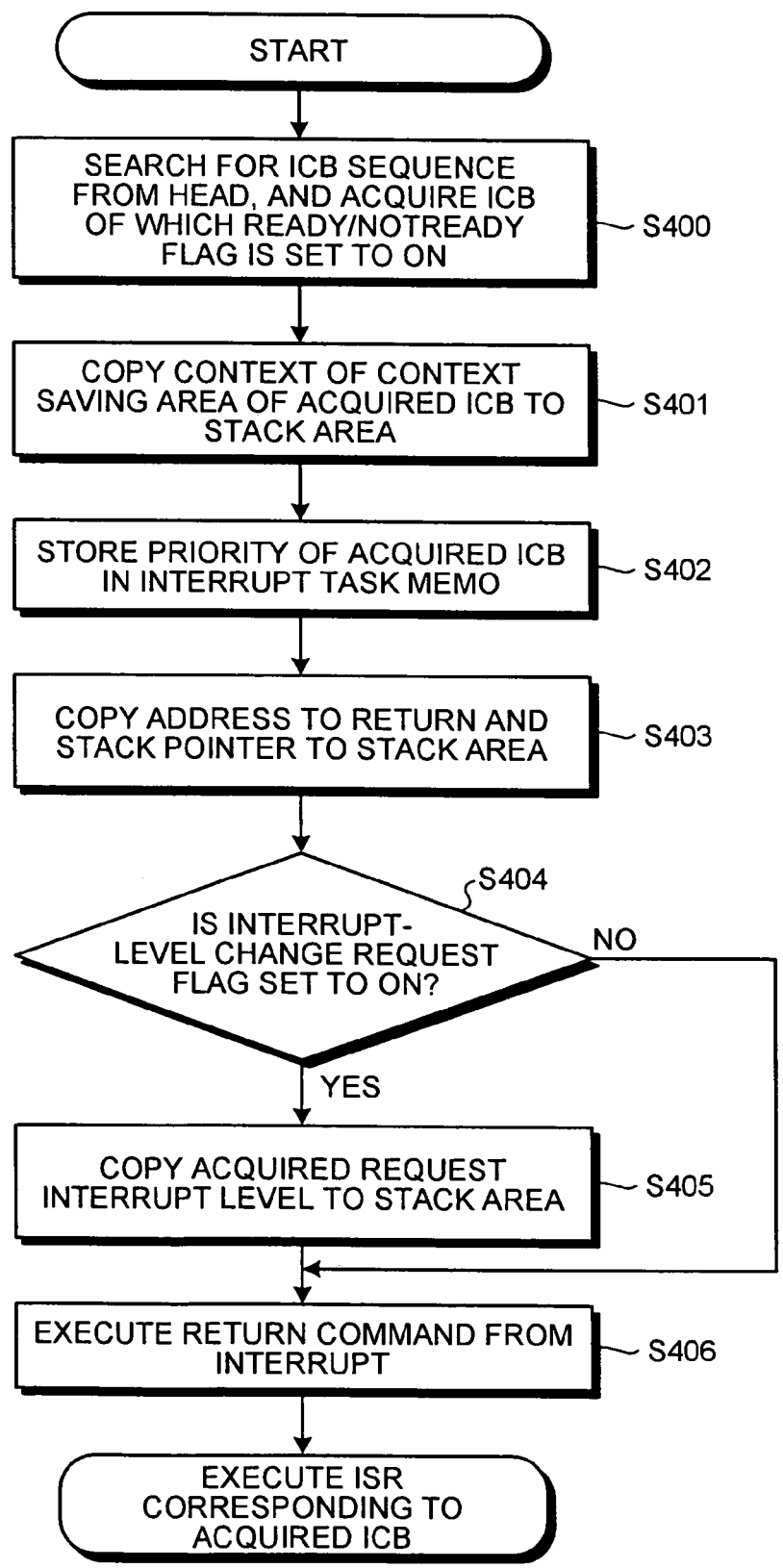
FIG. 9 is a flowchart of a processing procedure for an operation of a dispatcher according to the first embodiment.

FIG. 9 is a flowchart of a processing procedure for an operation of the dispatcher 7. The dispatcher 7 searches for the ready/notready flag 1712 from the head of the ICBs 40 to 47 in the ICB sequence 4, based on a searching order stored in the data storing unit 3, and acquires the first ICBs 40 to 47 or the ICBs 40 to 47 having the ready/notready flag 1712 set to "ON" (Step S400).

The dispatcher 7 copies the context saved in the context saving area 181 of the acquired ICBs 40 to 47 to the stack area (Step S401). Then, the dispatcher 7 stores the priority of the acquired ICBs 40 to 47 in the interrupt task memo (Step S402).

The dispatcher 7 copies an address for returning from the interrupt and the stack pointer to the stack area (Step S403). The dispatcher 7 copies the address and the stack pointer saved in the context saving area 181 of the acquired ICBs 40 to 47 to the stack area. In other words, the dispatcher 7 rewrites the data of the stack area so that the program counter 12 and the stack register are set in such a manner that a process of the ISRs 80 to 87 corresponding to the acquired ICBs 40 to 47 is executed when a return command is executed.

The dispatcher 7 determines whether "ON" is set to the interrupt-level change request flag 1715 of the acquired ICBs 40 to 4.7 (Step S404). When "ON" is set to the interrupt-level change request flag 1715 of the acquired ICBs 40 to 47, the dispatcher 7 copies the value set in the request interrupt level 178 of the acquired ICBs 40 to 47 to the stack area (Step S405). In this manner, when returned from the interrupt by the return command, the interrupt level becomes the value set in the request interrupt level 178.

After copying the value set in the request interrupt level 178 to the stack area, or when "OFF" is set to the interrupt-level change request flag 1715, the dispatcher 7 executes the return command, and makes the ISRs 80 to 87 corresponding to the acquired ICBs 40 to 47 be executed (Steps S406, S407).

Figure 10:
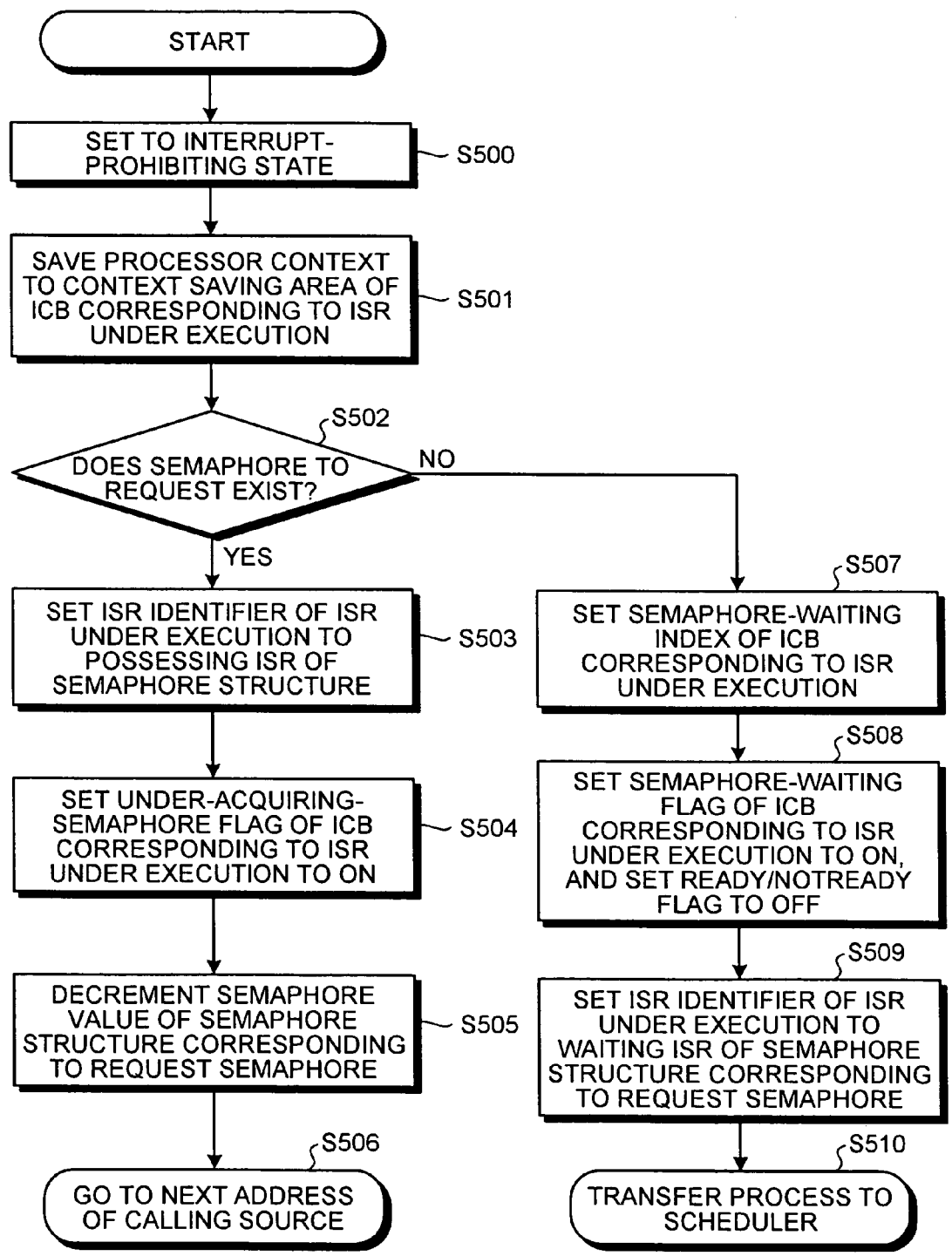
FIG. 10 is a flowchart of a processing procedure for an operation of a semaphore-acquiring task for transiting into a semaphore-waiting state, according to the first embodiment.

FIG. 10 is a flowchart of a processing procedure for an operation of a semaphore-acquiring process of the semaphore-acquiring task 93*a* (transiting into the semaphore-waiting state 405 when the semaphore could not be acquired).

The semaphore acquiring task 93*a* sets the operation mode of the CPU 11 to the interrupt-prohibiting state, and saves the processor context in the context saving area 181 of the ICBs 40 to 47 corresponding to the ISRs 80 to 87 that started the own task (that is being executed) (Steps S500, S501).

The semaphore acquiring task 93*a* checks if the semaphore to request (request semaphore) exists (Step S502). In other words, the semaphore acquiring task 93*a* determines whether the value of the semaphore value 211 of the semaphore structures 21 to 23 corresponding to the target semaphore is equal to or larger than "1". When the value of the semaphore value 211 is equal to or larger than "1", the semaphore acquiring task 93*a* recognizes that the semaphore to request exists, and when the value of the semaphore value 211 is "0", it recognizes that the semaphore to request does not exist.

When the request semaphore exists, the semaphore acquiring task 93*a* sets the ISR identifier of the ISRs 80 to 87 that are being executed to the possessing ISR 212 of the semaphore structures 21 to 23 corresponding to the request semaphore (Step S503).

The semaphore acquiring task 93a sets "ON" to the under-acquiring-semaphore flag 1713 of the ICBs 40 to 47 corresponding to the ISRs 80 to 87 that are being executed (Step S504). Then, the semaphore acquiring task 93a subtracts "1" from the value of the semaphore value 211 of the semaphore structures 21 to 23 corresponding to the request semaphore (decrement), and returns to the address next to the calling source (Steps S505, S506).

On the other hand, when the request semaphore does not exist, the semaphore acquiring task 93a sets an index of the request semaphore to the semaphore-waiting index 173 of the ICBs 40 to 47 corresponding to the ISRs 80 to 87 that are being executed (Step S507).

The semaphore acquiring task 93a sets "ON" to the semaphore-waiting flag 1714 of the ICBs 40 to 47 corresponding to the ISRs 80 to 87 that are being executed, and at the same time, sets "OFF" to the ready/notready flag 1712 (Step S508). In this manner, the state of the ISRs 80 to 87 that are being executed is transited from the execution state 404 into the semaphore-waiting state 405.

The semaphore acquiring task 93a sets the ISR identifier of the ISRs 80 to 87 that are being executed to the waiting ISR 213 of the semaphore structures 21 to 23 corresponding to the request semaphore, and transfers the process to the scheduler 6 (Steps S509, S510).

Figure 11:
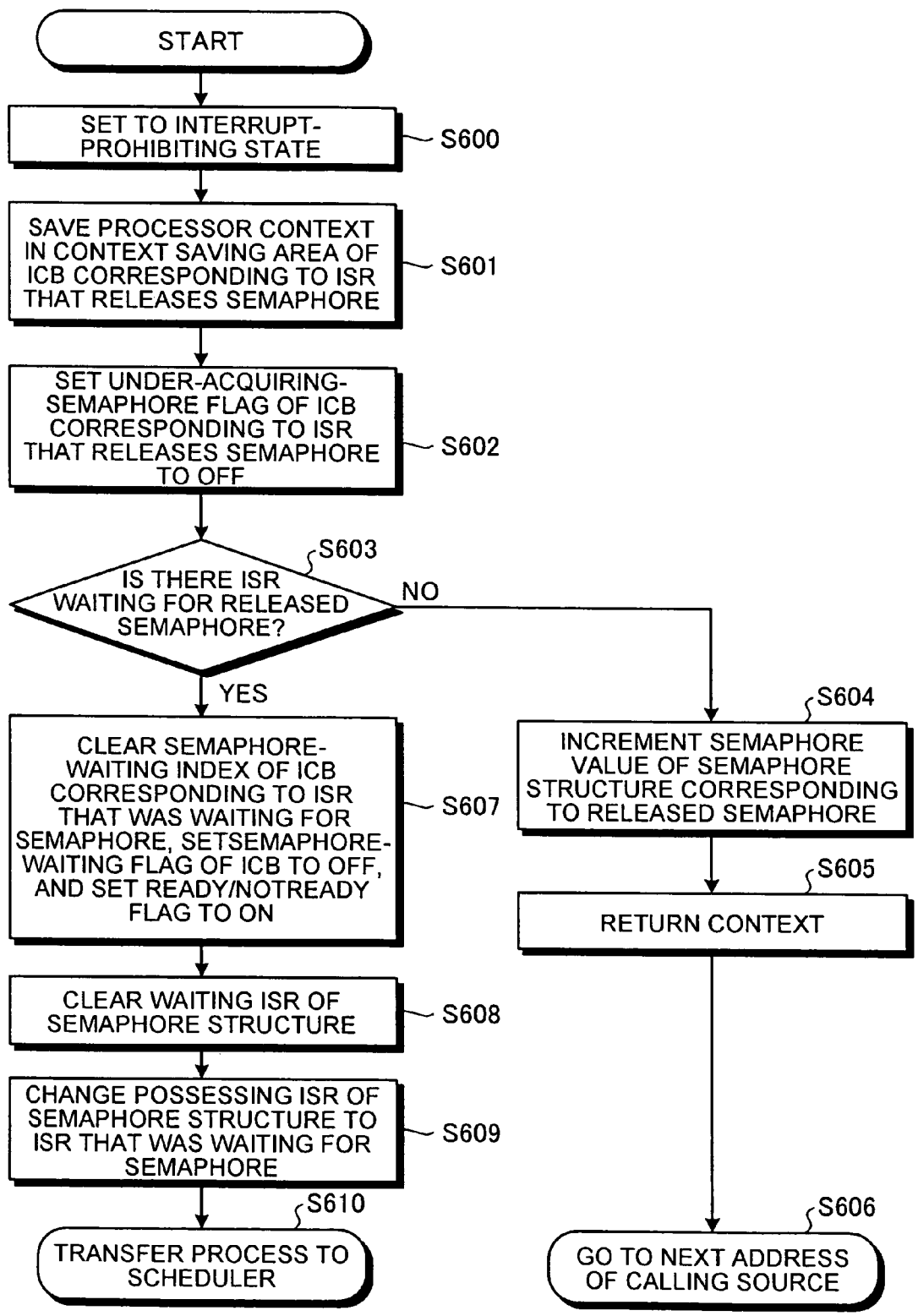
FIG. 11 is a flowchart of a processing procedure for an operation of a semaphore-releasing task according to the first embodiment.

FIG. 11 is a flowchart of a processing procedure for an operation of a semaphore-releasing process of the semaphore-releasing task 94. The semaphore-releasing task 94 sets the operation mode of the CPU 11 to the interrupt-prohibiting state, and saves the processor context in the context saving area 181 of the ICBs 40 to 47 corresponding to the ISRs 80 to 87 that release the semaphore (that started the semaphore-releasing task 94) (Steps S600, S601).

The semaphore-releasing task 94 sets "OFF" to the under-acquiring-semaphore flag 1713 of the ICBs 40 to 47 corresponding to the ISRs 80 to 87 that releases the semaphore (Step S602). Then, the semaphore-releasing task 94 determines whether the ISRs 80 to 87 that released the semaphore exist (Step S603). In other words, the semaphore-releasing task 94 determines whether the ISR identifier is set to the waiting ISR 213 of the semaphore structures 21 to 23 corresponding to the released semaphore.

When the ISRs 80 to 87 that released the semaphore exist, the semaphore-releasing task 94 increments the value of the semaphore value 211 of the semaphore structures 21 to 23 corresponding to the released semaphore (Step S604).

The semaphore-releasing task 94 returns the processor context saved in the context saving area 181 of the ICBs 40 to 47 corresponding to the ISRs 80 to 87 that releases the semaphore at Step S601 (copies the processor context to the stack area), and returns to the address next to the calling source that started the semaphore-releasing task 94 (Steps S605, S606).

On the other hand, when the ISRs 80 to 87 that released the semaphore do not exist, the semaphore-releasing task 94 clears the semaphore-waiting index 173 of the ICBs 40 to 47 corresponding to the ISRs 80 to 87 that are waiting for the semaphore, and at the same time, sets "OFF" to the semaphore-waiting flag 1714. Then, the semaphore-releasing task 94 sets "ON" to the ready/notready flag 1712 (Step S607).

The semaphore-releasing task 94 clears the waiting ISR 213 of the semaphore structures 21 to 23 corresponding to the released semaphore (Step S608). In the waiting ISR 213, the ISR identifier of the ISRs 80 to 87 that are waiting for the released semaphore is set. When a plurality of ISR identifiers is set to the waiting ISR 213, the semaphore-releasing task 94 selects the ISRs 80 to 87 that will acquire the semaphore next in an order determined in advance. For example, the ISRs 80 to 87 that are set in the waiting ISR 213 first can be selected, and the ISRs 80 to 87 having the highest priority from among the ISRs 80 to 87 that are set in the waiting ISR 213 can be selected.

The semaphore-releasing task 94 sets the ISR identifier of the selected ISRs 80 to 87 to the possessing ISR 212 of the semaphore structures 21 to 23 corresponding to the released semaphore (Step S609). In other words, the semaphore-releasing task 94 changes the setting of the possessing ISR 212 to the ISRs 80 to 87 that were waiting for the semaphore. After that, the semaphore-releasing task 94 transfers the process to the scheduler 6 (Step S610).

Figure 12:
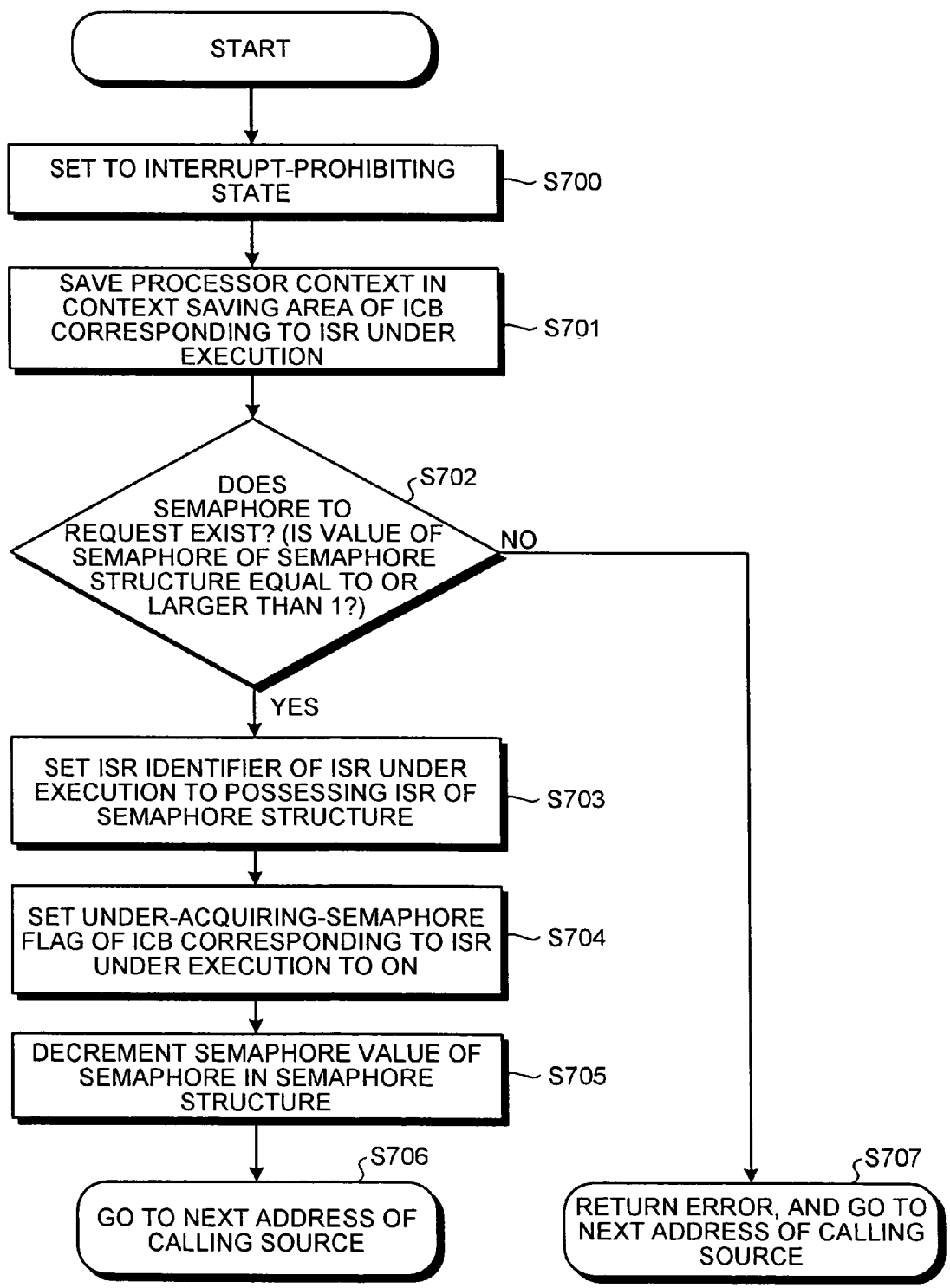
FIG. 12 is a flowchart of a processing procedure for an operation of a semaphore-acquiring task for not transiting into a semaphore-waiting state, according to the first embodiment.

FIG. 12 is a flowchart of a processing procedure for an operation of a semaphore-acquiring process of the semaphore-acquiring task 93b (a process not transiting into the semaphore-waiting state even when the semaphore cannot be acquired). Regarding Steps S700 to S706 at which the request semaphore exists that the semaphore is acquired, because it is the same as the operation of Steps S500 to S506 for the semaphore-acquiring process of the semaphore-acquiring task 93a explained with reference to the flowchart shown in FIG. 10, a detailed explanation will be omitted.

The semaphore-acquiring task 93b sets the operation mode of the CPU 11 to the interrupt-prohibiting state, saves the processor context in the context saving area 181 of the ICBs 40 to 47 corresponding to the ISRs 80 to 87 that started the semaphore-acquiring task 93b (that is currently being executed), and checks if the request semaphore (target semaphore) exists (Steps S700 to S702).

When the semaphore to request (request semaphore) exists, the semaphore-acquiring task 93b sets the ISR identifier of the ISRs 80 to 87 that are currently being executed to the possessing ISR 212 of the semaphore structures 21 to 23 corresponding to the request semaphore (Step S703).

The semaphore-acquiring task 93b sets "ON" to the under-acquiring-semaphore flag 1713 of the ICBs 40 to 47 corresponding to the ISRs 80 to 87 that are being executed, and at the same time, decrements the value of the semaphore value 211 of the semaphore structures 21 to 23 corresponding to the released semaphore. Then, the semaphore-acquiring task 93b returns to the address next to the calling source (Steps S704 to S706).

On the other hand, when the request semaphore does not exist, the semaphore-acquiring task 93b returns an error (a code indicating that the semaphore could not be acquired), and returns to the address next to the calling source (Step S707).

Figure 13:
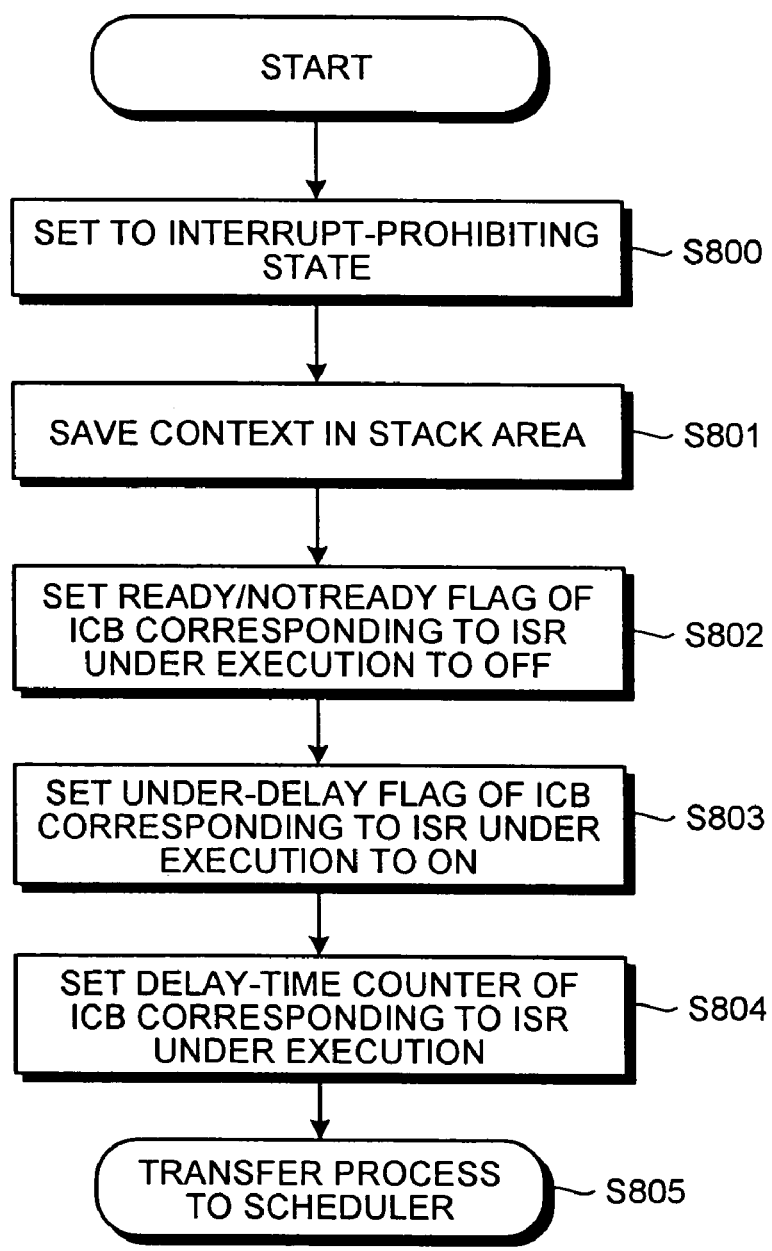
FIG. 13 is a flowchart of a processing procedure for an operation of an ISR delaying task according to the first embodiment.

FIG. 13 is a flowchart of a processing procedure for an operation of a delay process of the ISR delaying task 95. The ISR delaying task 95 sets the operation mode of the CPU 11 to the interrupt-prohibiting state, and saves the context in the stack area (Steps S800, S801).

The ISR delaying task 95 sets "OFF" to the ready/notready flag 1712 of the state flag 171 of the ICBs 40 to 47 corresponding to the ISRs 80 to 87 that is being executed, and sets "ON" to the under-delay flag 1718 (Steps S802, S803). This makes the state of the ISRs 80 to 87 that is being executed transit from the execution state 404 into the execution-suspending state 406.

The ISR delaying task 95 sets a time to stay at the execution-suspending state 406, i.e., the time to delay the ISRs 80 to 87 that started the ISR delaying task 95, to the delay-time counter 179 of the corresponding ICBs 40 to 47, and transfers the process to the scheduler 6 (Step S804, S805).

The value of the delay-time counter 179 is decremented by the timer interrupt handler 98. Therefore, the value set in the delay-time counter 179 becomes "the time to delay/the time at which the timer interrupt handler 98 starts". The time at which the timer interrupt handler 98 starts is an interrupt time by a timer (not shown) in the processor 1.

Figure 14:
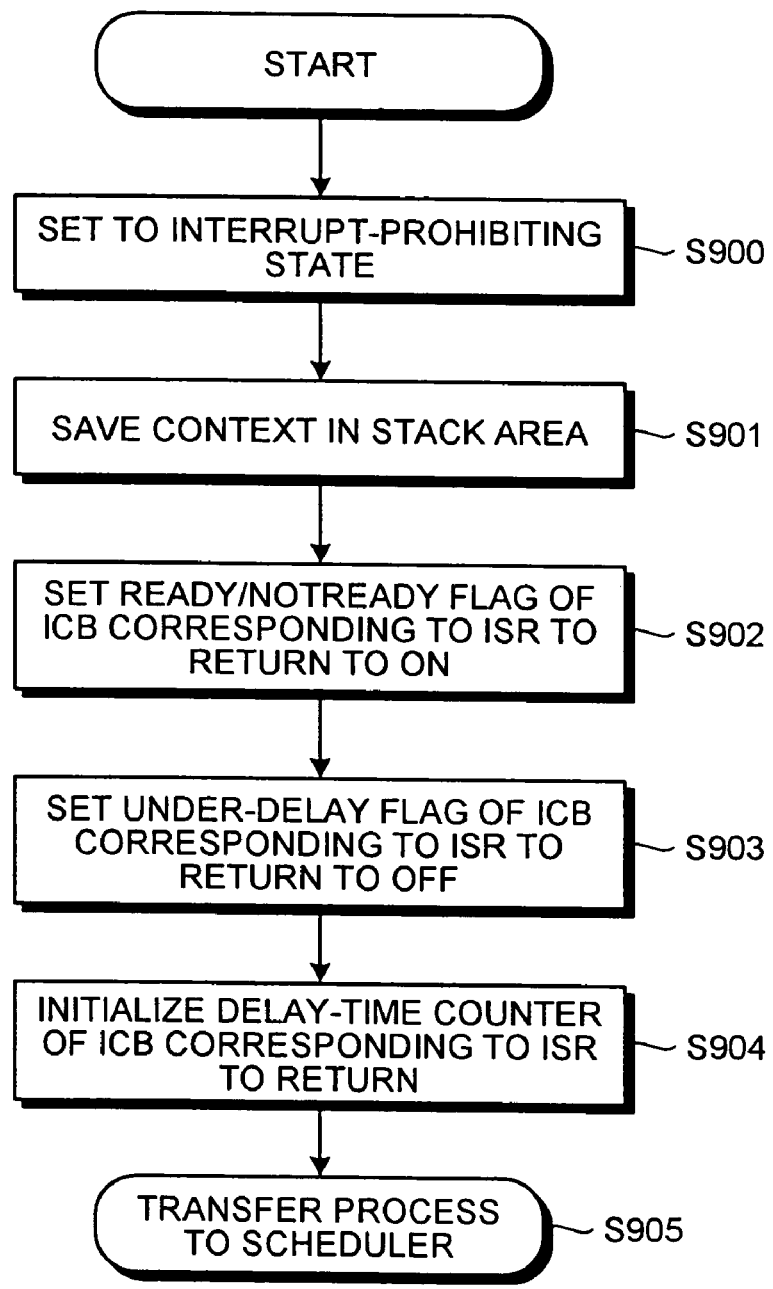
FIG. 14 is a flowchart of a processing procedure for an operation of an ISR returning task according to the first embodiment.

FIG. 14 is a flowchart of a processing procedure for an operation of an ISR returning process of the ISR returning task 96. The ISR returning task 96 sets the operation mode of the CPU 11 to the interrupt-prohibiting state, and saves the context in the stack area (Steps S900, S901).

The ISR returning task 96 sets "ON" to the ready/notready flag 1712 of the state flag 171 of the ICBs 40 to 47 corresponding to the ISRs 80 to 87 to be returned from the execution-suspending state 406, and sets "OFF" to the under-delay flag 1718 (Steps S902, S903). This makes the state of the ISRs 80 to 87 to be returned transit from the execute-suspending state 406 into the execution-waiting state 403.

The ISR returning task 96 initializes the value of the delay-time counter 179 of the ICBs 40 to 47 corresponding to the ISRs 80 to 87 to be returned (for example, sets "null"), and transfers the process to the scheduler 6 (Steps S904, S905).

Figure 15:
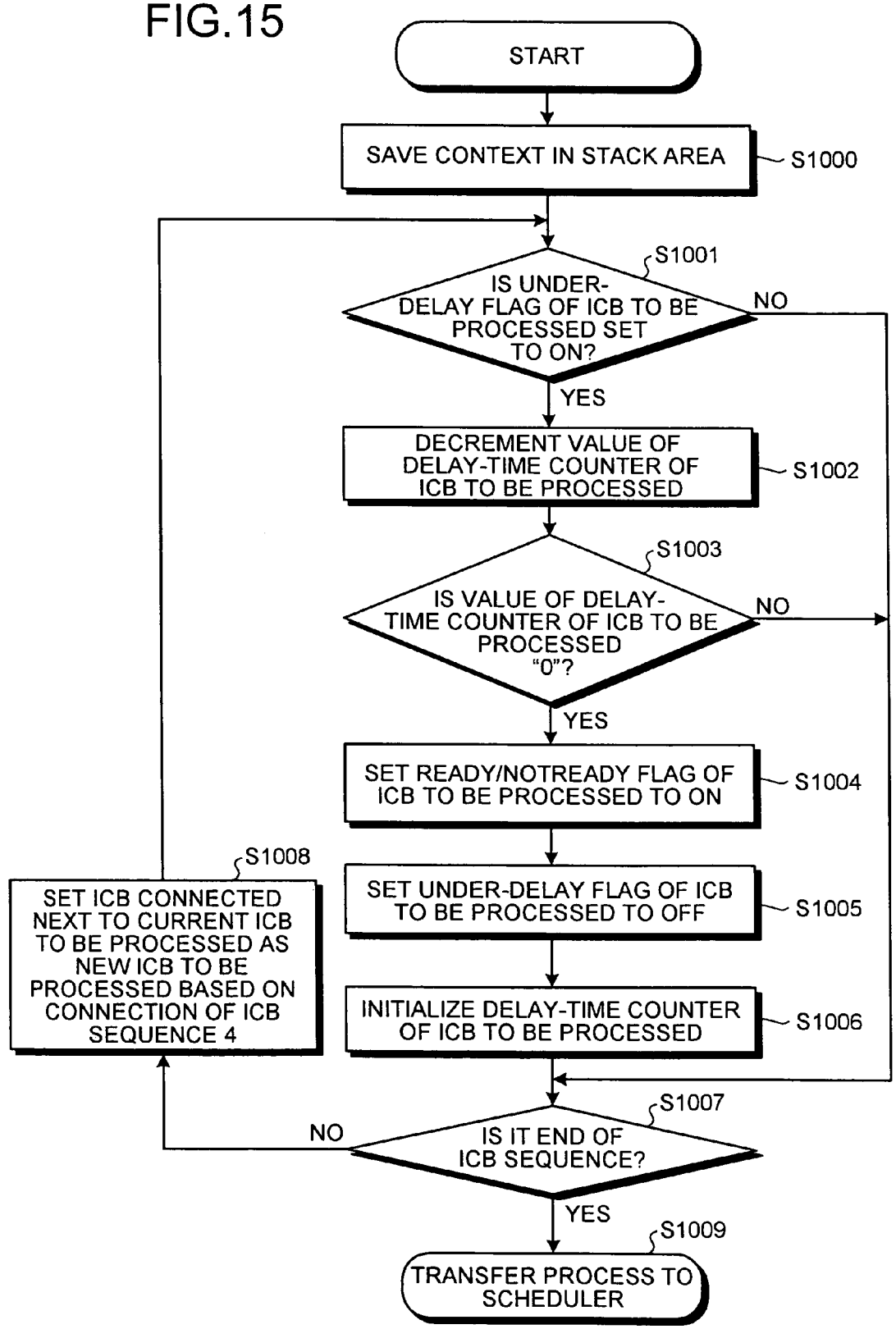
FIG. 15 is a flowchart of a processing procedure for an operation of a timer interrupt handler according to the first embodiment.

FIG. 15 is a flowchart of a processing procedure for an operation of a timer interrupt process of the timer interrupt handler 98. The timer interrupt handler 98 saves the context in the stack area (Step S1000).

The timer interrupt handler 98 takes the ICBs 40 to 47 at the head of the connection of the ICBs 40 to 47 as an ICB to be processed, and determines whether "ON" ("1") is set to the under-delay flag 1718 of the ICB to be processed (Step S1001). When "ON" is set to the under-delay flag 1718 of the ICB to be processed, the timer interrupt handler 98 decrements the value of the delay-time counter 179 of the ICB to be processed (Step S1002).

The timer interrupt handler 98 determines whether the value of the delay-time counter 179 of the ICB to be processed is "0" (Step S1003). When the value of the delay-time counter 179 of the ICB to be processed is "0", the timer interrupt handler 98 sets "ON" to the ready/notready flag 1712 of the ICB to be processed, and at the same time, sets "OFF" to the under-delay flag 1718 (Steps S1004, S1005). In addition, the timer interrupt handler 98 initializes the delay-time counter 179 of the ICB to be processed (for example, sets "null") (Step S1006).

The timer interrupt handler 98 repeats an operation to initialize the delay-time counter 179 until the ICB to be processed becomes the last ICB of the ICB sequence 4 by carrying out: taking the ICBs 40 to 47 connected next to the current ICB to be processed based on the connection of the ICB sequence 4 as a new ICB to be processed; decrementing the value of the delay-time counter 179 when "ON" is set to the under-delay flag 1718 of the ICB to be processed; setting "ON" to the ready/notready flag 1712 of the ICB to be processed when the value of the delay-time counter 179 after the decrementing is "0"; and setting "OFF" to the under-delay flag 1718 (Steps S1001 to S1008).

The timer interrupt handler 98 transfers the process to the scheduler 6 when the ICB to be processed becomes the last ICB in the ICB sequence 4 (Step S1009).

Figure 16:
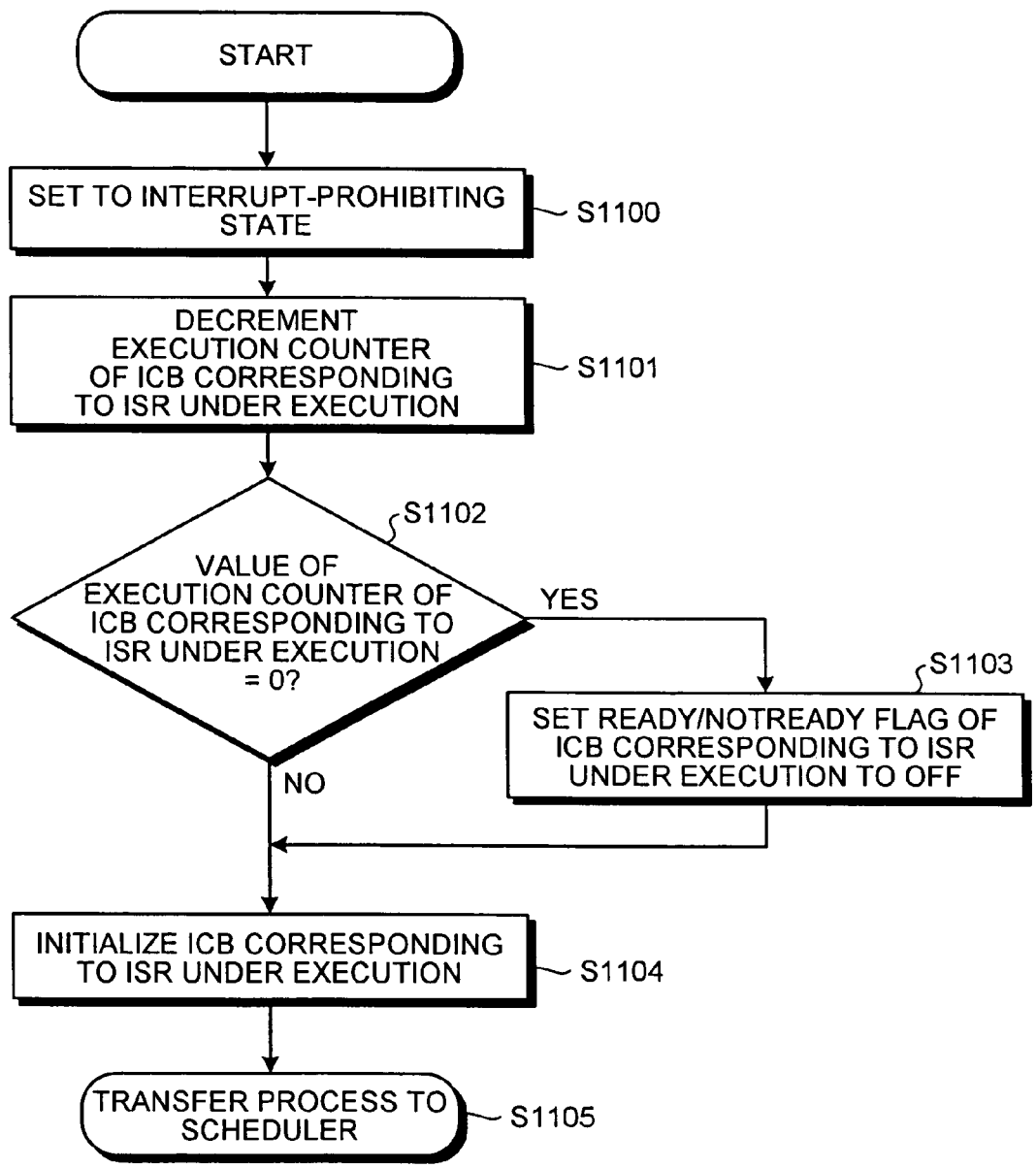
FIG. 16 is a flowchart of a processing procedure for an operation of an ISR exiting task according to the first embodiment.

FIG. 16 is a flowchart of a processing procedure for an operation of an ISR exiting process of the ISR exiting task 97. The ISR exiting task 97 sets the operation mode of the CPU 11 to the interrupt-prohibiting state (Step S1100).

The ISR exiting task 97 decrements the value of the execution counter 172 of the ICBs 40 to 47 corresponding to the ISRs 80 to 87 that started the own task (that is being executed) (Step S1101). Then, the ISR exiting task 97 determines whether the value of the execution counter 172 of the ICBs 40 to 47 corresponding to the ISRs 80 to 87 that is being executed is "0" (Step S1102).

When the value of the execution counter 172 of the ICBs 40 to 47 corresponding to the ISRs 80 to 87 that is being executed is "0", the ISR exiting task 97 sets "OFF" to the ready/notready flag 1712 of the ICBs 40 to 47 corresponding to the ISRs 80 to 87 that is being executed (Step S1103). This makes the state of the ISRs 80 to 87 that is being executed transit from the execution state 404 into the interrupt-waiting state 402.

After setting "OFF" to the ready/notready flag 1712 of the ICBs 40 to 47 corresponding to the ISRs 80 to 87 that is being executed, or when the value of the execution counter 172 of the ICBs 40 to 47 corresponding to the ISRs 80 to 87 that is being executed is not "0", the ISR exiting task 97 initializes the ICBs 40 to 47 corresponding to the ISRs 80 to 87 that is being executed (Step S1104).

After initializing the stack bottom address 176 of the ICBs 40 to 47 corresponding to the ISRs 80 to 87 that is being executed and the context saving area 181, the ISR exiting task 97 transfers the process to the scheduler 6 (Step S1105).

In this manner, according to the first embodiment, when carrying out a scheduling of an ISR based on a semaphore structure that is applied to an embedded software configured with a plurality of ISRs including the steady state, is associated with a plurality of semaphores used for a plurality of ISRs, and holds information on a usage state of the semaphore, and an ICB sequence that includes an interrupt control block (ICB) that holds information on a state of each of the ISRs associated with interrupt levels of a plurality of ISRs, in which a plurality of ICBs is connected in order from the ISR having the highest priority of the interrupt level, an ISR starting task saves a processor context stored in a stack area in a context saving area of the ICB corresponding to an interrupted ISR when an interrupt has occurred, and at the same time, sets the ICB corresponding to the ISR of the occurred interrupt to an execution-waiting state. Then, a scheduler and a dispatcher, as a scheduling process of the ISR, select an ICB having the highest priority from among the ICBs to which the execution-waiting state is set, and saves the processor context stored in the context saving area of the selected ICB in the stack area, to execute the ISR corresponding to the selected ICB by an interrupt return command.

In other words, the processor context stored in the stack area at the time of the interrupt occurrence is saved in the context saving area of the ICB corresponding to the ISR that is interrupted, a state of the ISR of the occurred interrupt is transited into the execution-waiting state, the processor context stored in the context saving area of the ICB corresponding to the ISR having the highest priority from among the ISRs in the execution-waiting state is saved in the stack area, and a return address for returning by the interrupt return command is replaced, thereby the ISR having the highest priority from among the ISRs in the execution-waiting state is executed. With this mechanism, it is not necessary to employ the real-time OS, and it is possible to reduce a memory capacity required for a product with a minimum structure (only ISR) to realize the synchronized exclusive control, as compared with a case in which the real-time OS is employed.

Furthermore, according to the first embodiment, when the value of the number of semaphore structures associated with a semaphore that is requested by an ISR that is being executed is equal to or larger than "1", a semaphore-acquiring task decrements the value of the number of semaphore structures, and at the same time, acquires the semaphore by setting an ISR identifier of the ISR that requests the semaphore to a corresponding possessing ISR. On the other hand, when the value of the number of semaphore structures is smaller than "1", the semaphore-acquiring task sets the ISR identifier of the ISR that requests the semaphore to a corresponding waiting ISR, and sets the ICB associated with the ISR that requested the semaphore to a waiting state. The semaphore-releasing task increments the number of semaphores of a semaphore structure associated with a semaphore that is released by the ISR that is being executed, and at the same time, deletes the ISR identifier of the ISR that releases the semaphore, which is set in the possessing ISR. When the ISR identifier is set in the waiting ISR, the semaphore-releasing task decrements the number of semaphores, and at the same time, sets the ISR identifier set in the waiting ISR to the possessing ISR. Then, the semaphore-releasing task deletes the ISR identifier set in the waiting ISR, and sets the ICB associated with the ISR that newly acquired the semaphore to an execution-waiting state.

In other words, when the request semaphore cannot be acquired, the state of the ISR that requested the semaphore is transited into the semaphore-waiting state, and the process is suspended. When the ISR possessing the request semaphore releases the semaphore, the ISR in the semaphore-waiting state acquires the released semaphore, and the state of the ISR that acquired the semaphore is transited into the execution-waiting state. With this mechanism, it is possible to realize the synchronized exclusive control without employing the real-time OS, even when executing the synchronized exclusive control with the ISR only.

Moreover, according to the first embodiment, an ISR starting task increments an execution counter of the ICB associated with the ISR that carries out a process of the occurred interrupt so that the ICB holds the number of interrupts, whenever an interrupt occurs. A dispatcher takes the ICB as a selection target as many times as the number of interrupts held by the execution counter, and executes the ISR that is associated as many times as the number of interrupts. An ISR exiting task decrements the value of the execution counter. Therefore, it is possible to recognize the number of interrupt occurrences, and execute a process as many times as the number of interrupt occurrences, even when realizing the synchronized exclusive control with the ISR only, without employing the real-time OS.

A second embodiment of the present invention will be explained with reference to FIGS. 17 to 21A and 21B. According to the second embodiment, it is configured to avoid an inverse of the priority (priority of the interrupt level) when using the semaphore.

The inverse of the priority will be explained with reference to FIGS. 5 and 17. To make the explanation simple, it is assumed that the number of the semaphores is one, and when one ISR possesses the semaphore, it is not possible for the other task to acquire the semaphore.

Figure 17:
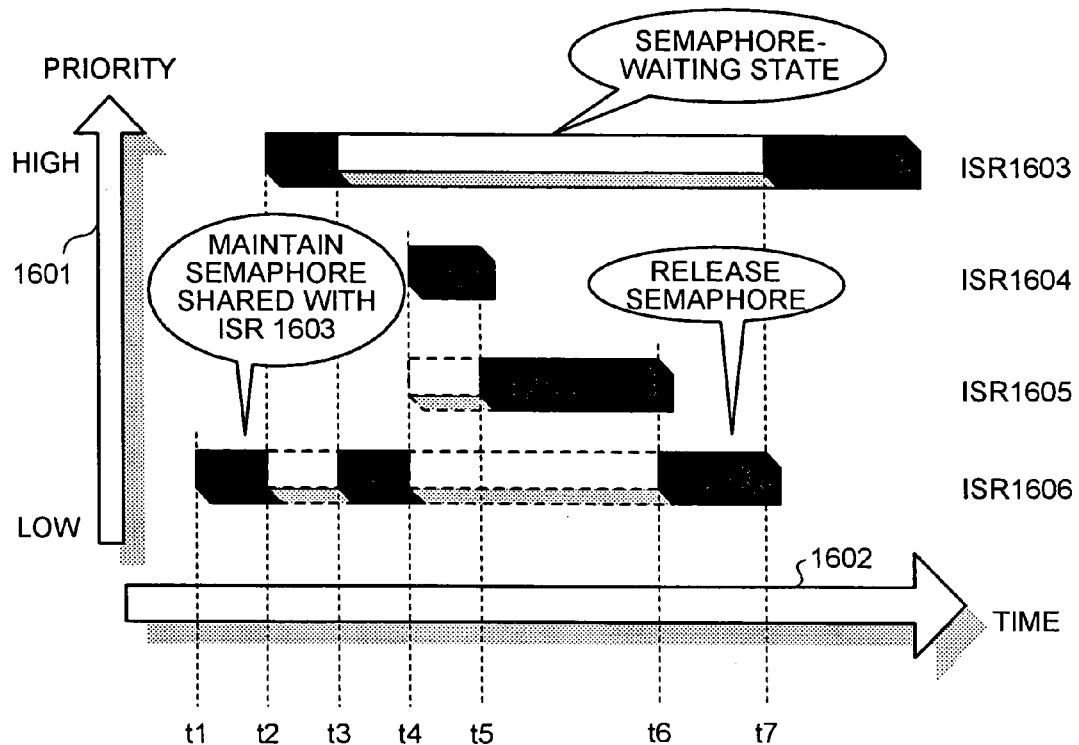
FIG. 17 is a schematic diagram for illustrating a reverse of a priority.

FIG. 17 is a schematic diagram for illustrating the reverse of the priority. The vertical axis 1601 represents the priority, and the horizontal axis 1602 represents time (elapse of time). An ISR 1603 has the highest priority from among ISRs 1603 to 1606 (priority 4), an ISR 1604 has a priority next to the ISR 1603 (priority 3), an ISR 1605 has a priority next to the ISR 1604 (priority 2), and an ISR 1606 has the lowest priority from among the ISRs 1603 to 1606 (priority 1).

The ISR 1606 is started at the time t1. At the time t1, because the ISR 1606 is started only, the ISR 1606 becomes the execution state 404, and acquires a semaphore.

The ISR 1603 is started at the time t2. Because the ISR 1603 has the priority 4, and the ISR 1606 in the execution state has the priority 1, the ISR 1606 becomes the execution-waiting state 403, and the ISR 1603 becomes the execution state 404.

At the time t3, the ISR 1603 in the execution state 404 tries to acquire the semaphore. However, because the ISR 1606 possesses the shared semaphore, the ISR 1603 becomes the semaphore-waiting state 405. For this reason, although the priority of the ISR 1606 is lower than the priority of the ISR 1603, the ISR 1606 becomes the execution state 404.

The ISRs 1604 and 1605 are started at the time t4. Because the ISR 1604 has the priority 3, and the ISR 1605 has the priority 2, the ISR 1606 in the execution state 404 becomes the execution-waiting state 403, and the ISR 1604 becomes the execution state 404. In other words, the ISR 1604 having a lower priority becomes the execution state 404 prior to the ISR 1603 having the highest priority.

At the time t5, the ISR 1604 is ended (transited into the interrupt-waiting state 402). The ISRs 1603, 1605, and 1606 are in the waiting state at the time t5. The ISR 1603 has the highest priority from among the ISRs 1603, 1605, and 1606 in the waiting state (the execution-waiting state 403 and the semaphore-waiting state 405). However, the ISR 1603 is in the semaphore-waiting state 405 that waits for the semaphore acquired by the ISR 1606 to be released, and cannot be transited into the execution state 404. Therefore, the ISR 1605 having a priority next to the ISR 1603 becomes the execution state 404.

At the time t6, the ISR 1605 is ended. The ISRs 1603 and 1606 are in the waiting state at the time t6. Although the ISR 1603 has a higher priority than the ISR 1606, because the ISR 1603 is in the semaphore-waiting state 405 that waits for the semaphore acquired by the ISR 1606, the ISR 1606 becomes the execution state 404.

At the time t7, the ISR 1606 releases the semaphore, and the process is ended. Because the semaphore is released, the ISR 603 in the semaphore-waiting state 405 becomes the execution state 404 via the execution-waiting state 403, and acquires the semaphore to resume the process.

In this manner, when the ISR 1606 possesses the semaphore, if the ISRs 1604 and 1605 having the priority 2 and the priority 3, respectively, are started when the ISR 1603 having the priority 4 becomes the semaphore-waiting state 405, the ISR 1606 is executed after executing the ISR 1604 and 1605 having higher priorities than the ISR 1606 that possesses the semaphore, and the ISR 1603 having the highest priority is executed last. This kind of state in which the priority is inversed and the execution order of the ISRs 1603 to 1606 is changed is referred to as the inverse of the priority.

A method to avoid the inverse of the priority is to change the priorities between the ISR that possesses the semaphore and the ISR that shares the semaphore and is in the semaphore-waiting state. The inverse of the priority does not happen when the ISR that possesses the semaphore has a higher priority than the ISR that shares the semaphore and is in the semaphore-waiting state. Therefore, the priorities are changed between the ISRs only when the priority of the ISR that possesses the semaphore is lower than the priority of the ISR that shares the semaphore and is in the semaphore-waiting state.

Figure 18:
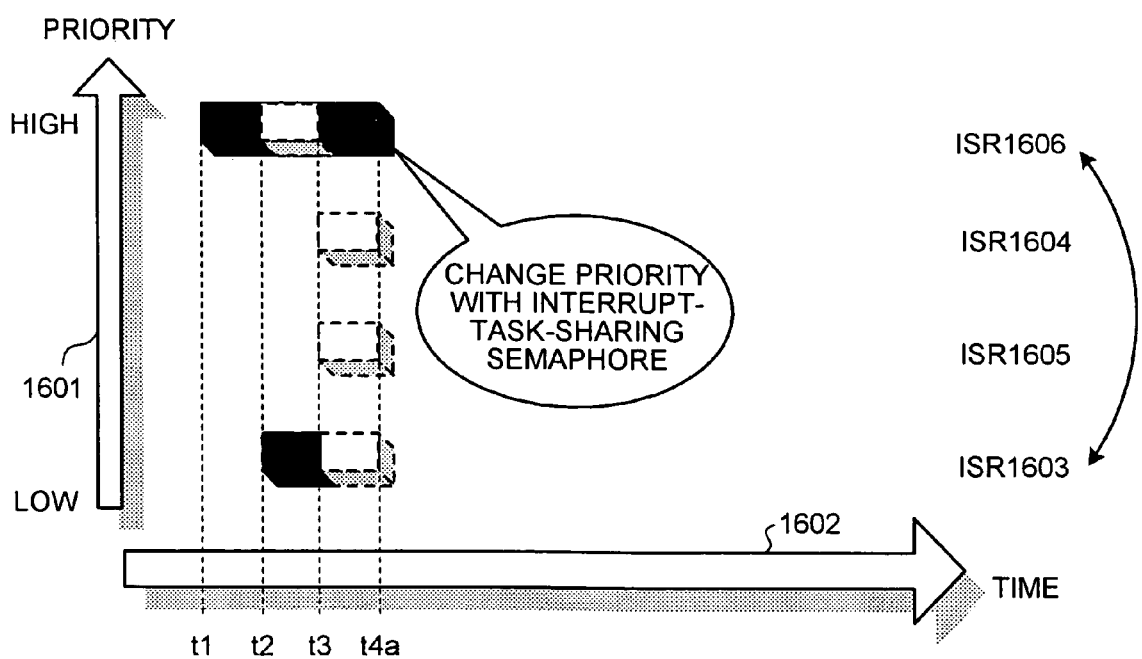
FIG. 18 is a schematic diagram for illustrating an avoidance of the reverse of the priority.

In other words, at the time t3 shown in FIG. 17, a change of the priorities is carried out when the ISR 1603 is transited into the semaphore-waiting state 405, so that the priority of the ISR 1606 becomes the priority 4, and the priority of the ISR 1603 becomes the priority 1. With this mechanism, as shown in FIG. 18, even when the ISR 1604 having the priority 3 and the ISR 1605 having the priority 2 are started, the ISR 1606 that possesses the semaphore becomes the execution state 404.

Figure 19:
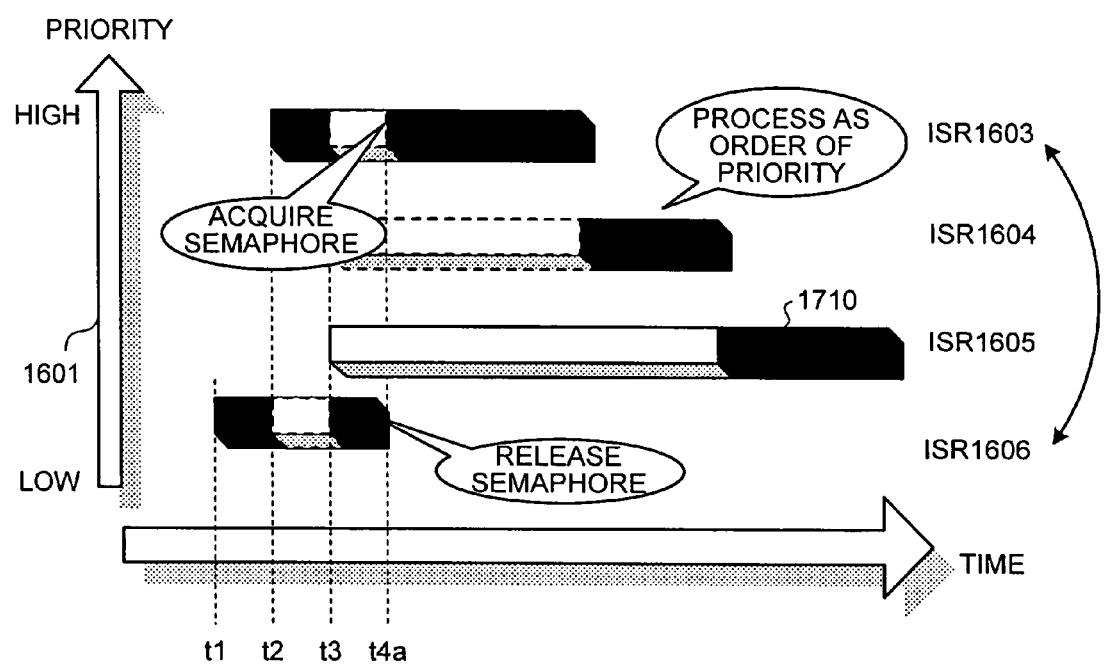
FIG. 19 is another schematic diagram for illustrating the avoidance of the reverse of the priority.

At the time t4a, the ISR 1606 releases the semaphore, and the process is ended. At this time, the ISR 1606 carries out a change of the priorities by setting the priority of the ISR 1603 in the semaphore-waiting state 405 to the priority 4, and setting the priority of the ISR 1606 to the priority 1. With this mechanism, as shown in FIG. 19, the ISR 1603 becomes the execution state 404 prior to the ISRs 1604 and 1605, and the process is executed in original order of the ISR 1603, the ISR 1604, and the ISR 1605, and as a result, it is possible to avoid the inverse of the priority when using the semaphore.

Following is an explanation for a real-time embedded simple monitor program according to the second embodiment, which avoids the inverse of the priority when using the semaphore. A configuration of an apparatus to which the real-time embedded simple monitor program according to the second embodiment is applied is the same as the configuration of the apparatus according to the first embodiment shown in FIG. 1, and a detailed explanation will be omitted.

The real-time embedded simple monitor program according to the second embodiment includes a semaphore-acquiring task 93c and a semaphore-releasing task 94a instead of the semaphore-acquiring task 93a and the semaphore-releasing task 94 of the real-time embedded simple monitor program according to the first embodiment shown in FIG. 2.

The semaphore-acquiring task 93c has, in addition to the functions of the semaphore-acquiring task 93a, a function of exchanging (changing) a priority of the ISRs 80 to 87 that possess the request semaphore with a priority of the ISRs 80 to 87 that is being executed, when the request semaphore cannot be acquired (when transiting into thee semaphore-waiting state 405).

The semaphore-releasing task 94a has, in addition to the functions of the semaphore-releasing task 94, a function of returning a changed priority to a priority determined in advance, when the priority of the ISRs 80 to 87 that started the own task (that is being executed).

Following is an explanation for an operation of the real-time embedded simple monitor program according to the second embodiment. Because a difference between the real-time embedded simple monitor program according to the second embodiment and the real-time embedded simple monitor program according to the first embodiment is the semaphore-acquiring process and the semaphore-releasing process, operations of the semaphore-acquiring task 93c to realize the semaphore-acquiring process and the semaphore-releasing task 94a to realize the semaphore-releasing process will be explained only.

Figure 20A:
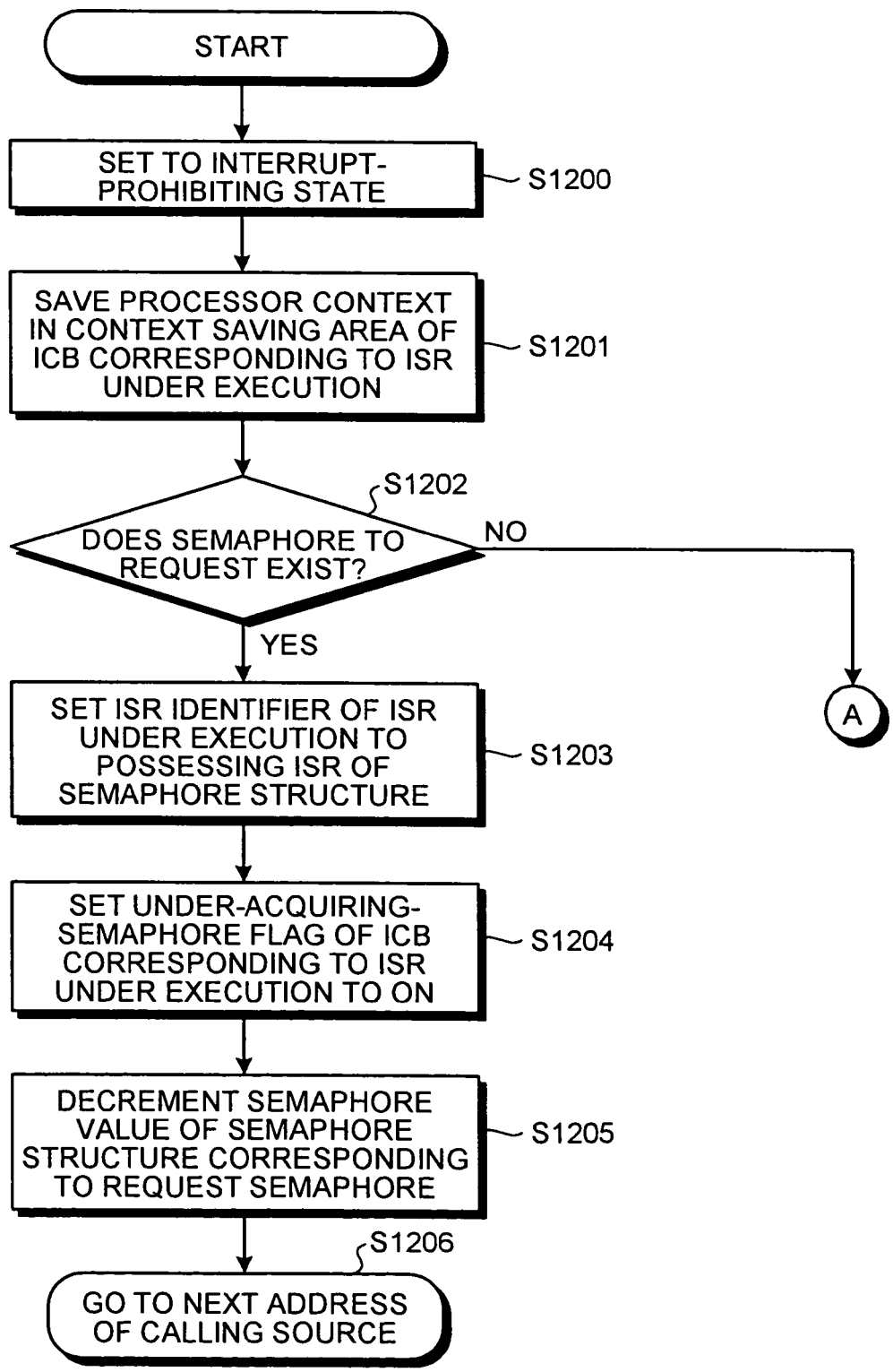
FIGS. 20A and 20B are flowcharts of a processing procedure for an operation of a semaphore-acquiring task for transiting into a semaphore-waiting state, according to a second embodiment of the present invention.
Figure 20B:
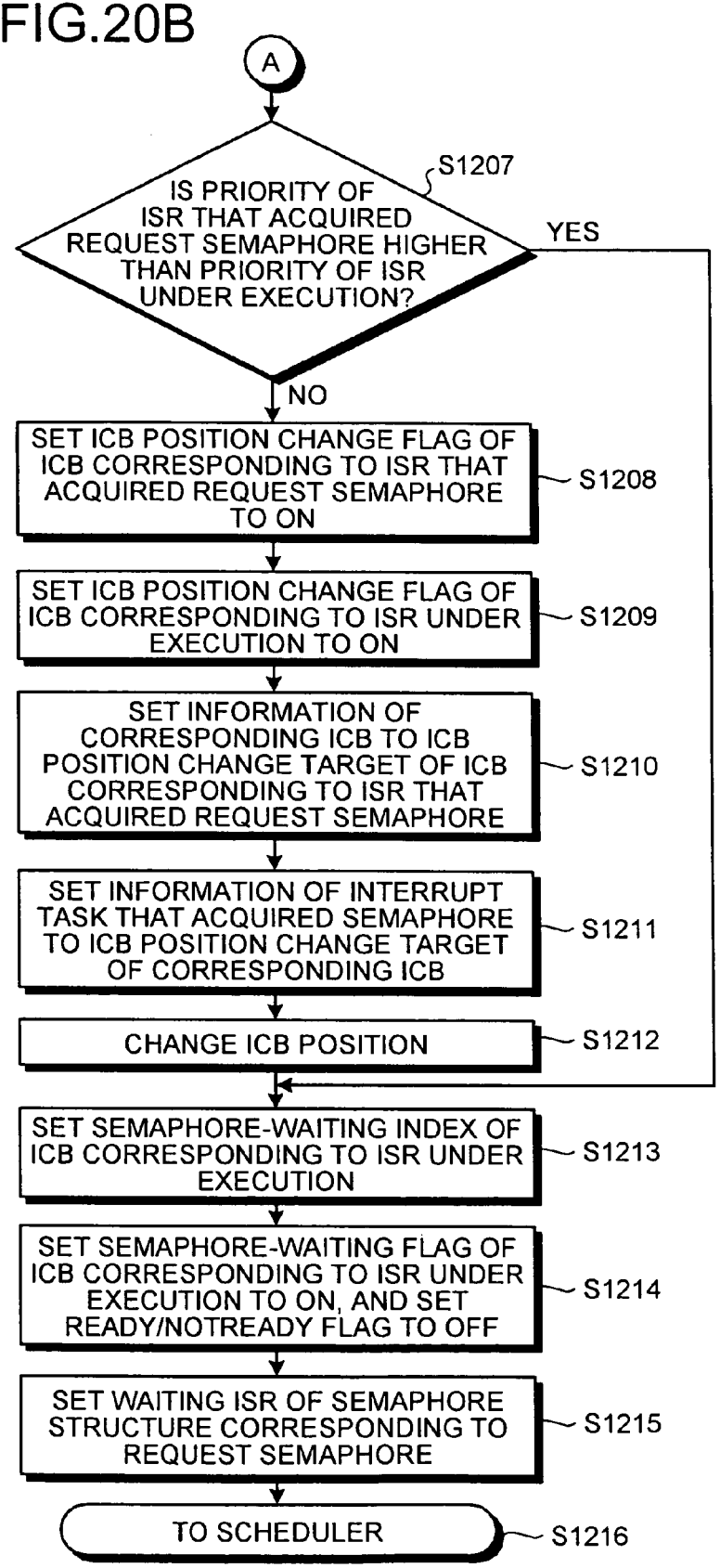

FIGS. 20A and 20B are flowcharts of a processing procedure for an operation of the semaphore-acquiring task 93c. The semaphore-acquiring task 93c sets the operation mode of the CPU 11 to the interrupt-prohibiting state, and saves the processor context in the context saving area 181 of the ICBs 40 to 47 corresponding to the ISRs 80 to 87 that started the own task (that is being executed) (Steps S1200, S1201 in FIG. 20A).

The semaphore-acquiring task 93c checks if the semaphore to request (request semaphore) exists (Step S1202 in FIG. 20A). When the request semaphore exists, the semaphore acquiring task 93c sets the ISR identifier of the ISRs 80 to 87 that are being executed to the possessing ISR 212 of the semaphore structures 21 to 23 corresponding to the request semaphore (Step S1203 in FIG. 20A).

The semaphore-acquiring task 93c sets "ON" to the under-acquiring-semaphore flag 1713 of the ICBs 40 to 47 corresponding to the ISRs 80 to 87 that are being executed (Step S1204 in FIG. 20A). Then, the semaphore acquiring task 93c decrements the value of the semaphore value 211 of the semaphore structures 21 to 23 corresponding to the request semaphore, and returns to the address next to the calling source (Steps S1205, S1206 in FIG. 20A).

On the other hand, when the request semaphore does not exist, the semaphore acquiring task 93c determines whether the priority of the ISRs 80 to 87 that possesses the request semaphore is higher than the priority of the ISRs 80 to 87 currently being executed (Step S1207 in FIG. 20B)

In other words, the semaphore-acquiring task 93c recognizes the ISRs 80 to 87 that possesses the request semaphore from the ISR identifier set in the possessing ISR 212 of the semaphore structures 21 to 23 corresponding to the request semaphore. Then, the semaphore-acquiring task 93c acquires the priority of the ISRs 80 to 87 currently being executed from the interrupt task memo in which the priority of the ISRs 80 to 87 currently being executed is set by the dispatcher 7. The semaphore-acquiring task 93c compares the priority of the recognized ISRs 80 to 87 with the priority acquired from the interrupt task memo, and determines whether the priority of the ISRs 80 to 87 that possess the request semaphore is higher than the priority of the ISRs 80 to 87 currently being executed.

When the priority of the ISRs 80 to 87 that possess the request semaphore is higher than the priority of the ISRs 80 to 87 currently being executed, the semaphore-acquiring task 93c sets "ON" to the ICB position change flag 1719 of the ICBs 40 to 47 corresponding to the ISRs 80 to 87 that possess the request semaphore (Step S1208 in FIG. 20B).

In addition, the semaphore-acquiring task 93c sets "ON" to the ICB position change flag 1719 of the ICBs 40 to 47 corresponding to the ISRs 80 to 87 currently being executed (Step S1209 in FIG. 20B).

The semaphore-acquiring task 93c sets information on the ISRs 80 to 87 currently being executed (ISR identifier) to the ICB position change target 180 of the ICBs 40 to 47 corresponding to the ISRs 80 to 87 that possess the request semaphore (Step S1210 in FIG. 20B).

In addition, the semaphore-acquiring task 93c sets information on the ISRs 80 to 87 that possess the request semaphore (ISR identifier) to the ICB position change target 180 of the ICBs 40 to 47 corresponding to the ISRs 80 to 87 currently being executed (Step S1211 in FIG. 20B)

The semaphore-acquiring task 93c changes the positions of the ICBs 40 to 47 (Step S1212 in FIG. 20B). In other words, the semaphore-acquiring task 93c changes the ICBs 40 to 47 corresponding to the ISRs 80 to 87 that possess the request semaphore with the ICBs 40 to 47 corresponding to the ISRs 80 to 87 currently being executed in the connection of the ICBs 40 to 47 in the ICB sequence 4. With this mechanism, the order with which the dispatcher 7 searches for the ISRs 80 to 87 to be executed is changed so that the priorities are changed.

The semaphore-acquiring task 93c sets an index of the request semaphore to the semaphore-waiting index 173 of the ICBs 40 to 47 corresponding to the ISRs 80 to 87 currently being executed (Step S1213 in FIG. 20B).

The semaphore-acquiring task 93c sets "ON" to the semaphore-waiting flag 1714 of the ICBs 40 to 47 corresponding to the ISRs 80 to 87 that are being executed, and at the same time, sets "OFF" to the ready/notready flag 1712 (Step S1214 in FIG. 20B). Then, the semaphore-acquiring task 93c sets the ISR identifier of the ISRs 80 to 87 currently being executed to the waiting ISR 213 of the semaphore structures 21 to 23 corresponding to the request semaphore, and transfers the process to the scheduler 6 (Steps S1215, S1216 in FIG. 20B).

Figure 21A:
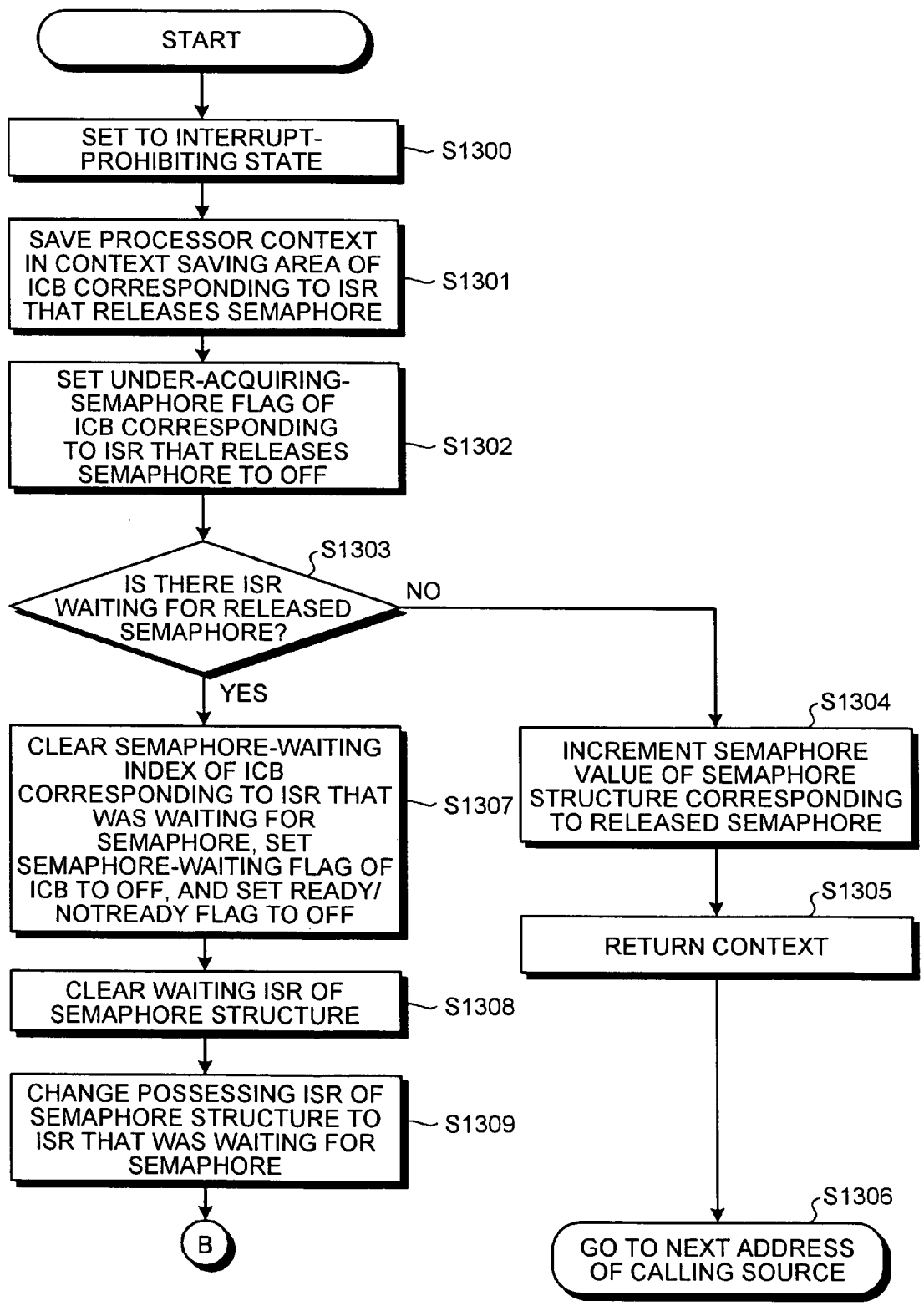
FIGS. 21A and 21B are flowcharts of a processing procedure for an operation of a semaphore-releasing task according to the second embodiment.
Figure 21B:
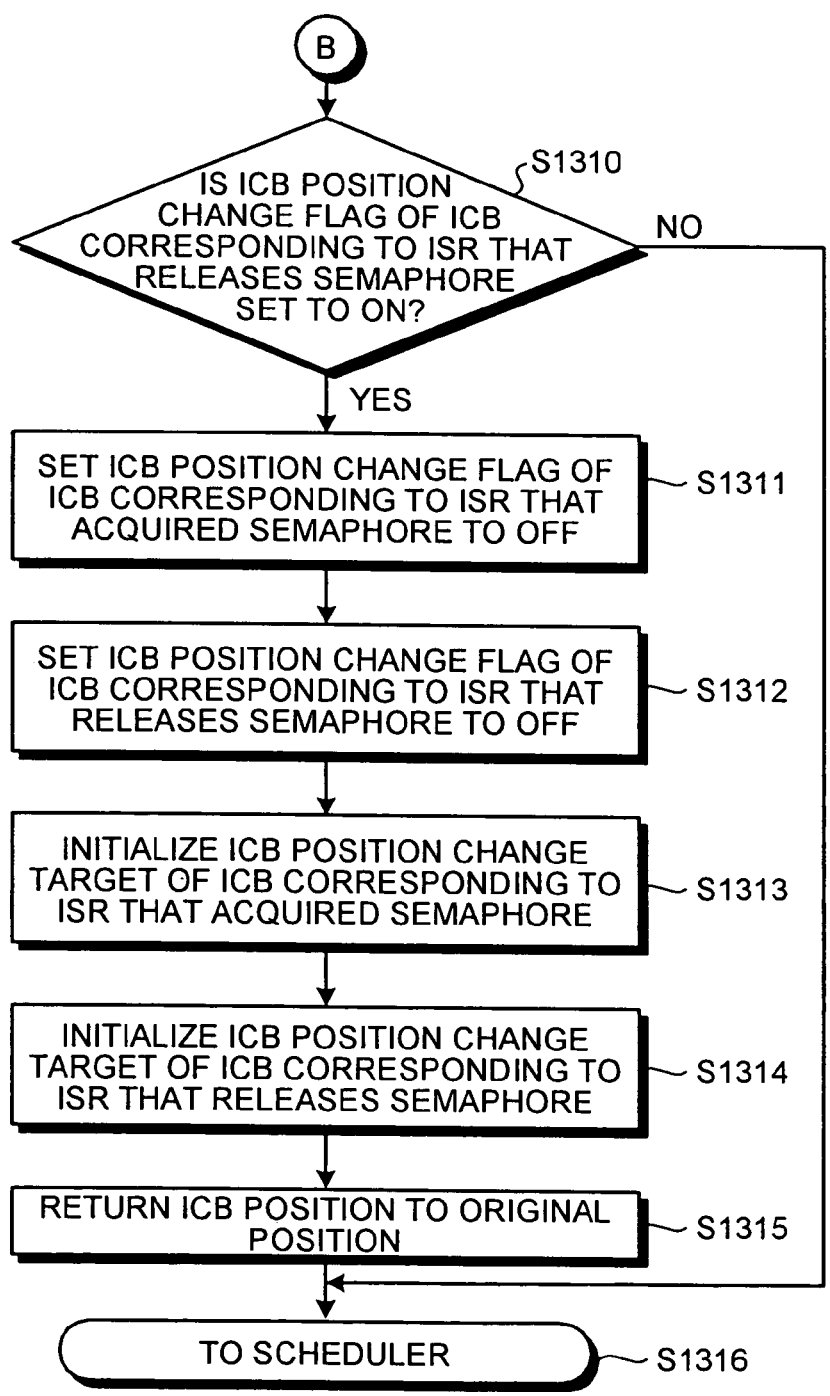

FIGS. 21A and 21B are flowcharts of a processing procedure for an operation of the semaphore-releasing task 94a. The semaphore-releasing task 94a sets the operation mode of the CPU 11 to the interrupt-prohibiting state, and saves the processor context in the context saving area 181 of the ICBs 40 to 47 corresponding to the ISRs 80 to 87 that release the semaphore (that started the semaphore-releasing task 94a) (Steps S1300, S1301 in FIG. 21A).

The semaphore-releasing task 94a sets "OFF" to the under-acquiring-semaphore flag 1713 of the ICBs 40 to 47 corresponding to the ISRs 80 to 87 that releases the semaphore (Step S1302 in FIG. 21A). Then, the semaphore-releasing task 94 determines whether the ISRs 80 to 87 that possess the released semaphore exist (Step S1303 in FIG. 21A).

When the ISRs 80 to 87 that possess the released semaphore exist, the semaphore-releasing task 94a increments the value of the semaphore value 211 of the semaphore structures 21 to 23 corresponding to the released semaphore (Step S1304 in FIG. 21A).

The semaphore-releasing task 94a returns the processor context saved in the context saving area 181 of the ICBs 40 to 47 corresponding to the ISRs 80 to 87 that releases the semaphore at Step S1301 (copies the processor context to the stack area), and returns to the address next to the calling source that started the semaphore-releasing task 94 (Steps S1305, S1306 in FIG. 21A).

On the other hand, when the ISRs 80 to 87 that possess the released semaphore do not exist, the semaphore-releasing task 94a clears the semaphore-waiting index 173 of the ICBs 40 to 47 corresponding to the ISRs 80 to 87 that are waiting for the semaphore, and at the same time, sets "OFF" to the semaphore-waiting flag 1714. Then, the semaphore-releasing task 94a sets "ON" to the ready/notready flag 1712 (Step S1307 in FIG. 21A).

The semaphore-releasing task 94a clears the waiting ISR 213 of the semaphore structures 21 to 23 corresponding to the released semaphore (Step S1308 in FIG. 21A). The semaphore-releasing task 94a sets the ISR identifier of the selected ISRs 80 to 87 to the possessing ISR 212 of the semaphore structures 21 to 23 corresponding to the released semaphore (Step S1309 in FIG. 21A).

The semaphore-releasing task 94a checks if "ON" is set to the ICB position change flag 1719 of the ICBs 40 to 47 corresponding to the ISRs 80 to 87 that releases the semaphore (Step S1310 in FIG. 21B).

When "ON" is set to the ICB position change flag 1719, the semaphore-releasing task 94a sets "OFF" to the ICB position change flag 1719 of the ICBs 40 to 47 corresponding to the ISRs 80 to 87 that acquired the semaphore (Step S1311 in FIG. 21B). In addition, the semaphore-releasing task 94a sets "OFF" to the ICB position change flag 1719 of the ICBs 40 to 47 corresponding to the ISRs 80 to 87 that releases the semaphore (Step S1312 in FIG. 21B).

The semaphore-releasing task 94a initializes the ICB position change target 180 of the ICBs 40 to 47 corresponding to the ISRs 80 to 87 that acquired the semaphore (Step S1313 in FIG. 21B). In addition, the semaphore-releasing task 94a initializes the ICB position change target 180 of the ICBs 40 to 47 corresponding to the ISRs 80 to 87 that release the semaphore (Step S1314 in FIG. 21B).

The semaphore-releasing task 94a returns the positions of the ICBs 40 to 47 in the ICB sequence 4 to the original positions (Step S1315 in FIG. 21B). In other words, the semaphore-releasing task 94a changes the ICBs 40 to 47 corresponding to the ISRs 80 to 87 that released the request semaphore with the ICBs 40 to 47 corresponding to the ISRs 80 to 87 that acquired the semaphore in the connection of the ICBs 40 to 47 in the ICB sequence 4. With this mechanism, the connection of the ICBs 40 to 47 that was changed when the ISRs 80 to 87 that acquired the semaphore is transited into the semaphore-waiting state 405 in the ICB sequence 4 is returned to the connection based on the original priority.

After returning the positions of the ICBs 40 to 47 in the ICB sequence 4 to the original positions, or when "OFF" is set to the ICB position change flag 1719 of the ICBs 40 to 47 corresponding to the ISRs 80 to 87 that releases the semaphore, the semaphore-releasing task 94a transfers the process to the scheduler 6 (Step S1316 in FIG. 21B).

In this manner, according to the second embodiment, when it is determined that a request semaphore is not available, a semaphore-acquiring task compares a priority of an ISR that possesses the request semaphore with a priority of an ISR that requested the semaphore, and when the priority of the ISR that possesses the request semaphore is lower than the priority of the ISR that requested the semaphore, changes a connection of an ICB sequence so that the priority of the ISR that possesses the request semaphore is changed with the priority of the ISR that requested the semaphore. At the same time, the semaphore-acquiring task sets information indicating that the priorities are changed to an ICB corresponding to the ISR of which the priority has been changed. When the information indicating that the priorities are changed is set to the ICB corresponding to the ISR that releases the semaphore, a semaphore-releasing task changes the connection of the ICB sequence so that the current priority of the ISR that releases the semaphore is changed with the current priority of the ISR of which the priority has been changed with the priority of the ISR that releases the semaphore. At the same time, the semaphore-releasing task sets information indicating that there is no change of the priorities to the ICB corresponding to the ISR of which the priority has been changed. With this mechanism, it is possible to avoid the inverse of the priority, in which the ISR is executed in an order different from the priority determined in advance, when using the semaphore.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A real-time embedded simple monitor method for performing a scheduling of a plurality of interrupt service routines based on a semaphore structure and an interrupt-control-block sequence, the real-time embedded simple monitor method comprising: interrupt-service-routine starting including saving, when an interrupt occurs, a value of a program counter, a stack pointer that is a value of a stack register, and a context stored in a stack area at a time of the interrupt occurrence, in a context saving area of an interrupt control block corresponding to an interrupt service routine that is interrupted; and setting the interrupt control block corresponding to the occurred interrupt to an execution-waiting state; scheduling including selecting an interrupt control block having a highest priority from among the interrupt control blocks that are set to the execution-waiting state; saving a value of a program counter, a stack pointer, and a context stored in a context saving area of the selected interrupt control block, in the stack area; and executing an interrupt service routine selected by an interrupt return command; and interrupt-service-routine exiting including setting, when exiting a process of the interrupt service routine executed at the scheduling, an interrupt control block corresponding to the exiting interrupt service routine to an interrupt-waiting state, wherein the semaphore structure is applied to an embedded software configured with the interrupt service routines including a steady-state, is associated with a plurality of semaphores used for the interrupt service routines, and holds information on a usage state of the semaphores, and in the interrupt-control-block sequence, plural interrupt control blocks holding information on a state of each of the interrupt service routines corresponding to interrupt levels of the interrupt service routines are connected in order of a priority of the interrupt level.

2. The real-time embedded simple monitor method according to claim 1, further comprising: semaphore acquiring including determining whether a request semaphore is available based on usage information that is held by a semaphore structure corresponding to a semaphore that is requested by the interrupt service routine executed at the scheduling; causing, when it is determined that the request semaphore is available, an interrupt service routine executed by updating information on number of available semaphores and information on the interrupt service routine that acquired the semaphore, from among the usage information, based on information on the interrupt service routine that requested the semaphore, to acquire the semaphore; updating, when it is determined that the request semaphore is not available, information on an interrupt service routine that is in a semaphore-waiting state from among the usage information, based on the information on the interrupt service routine that requested the semaphore; and setting an interrupt control block corresponding to the interrupt service routine that requested the semaphore to the semaphore-waiting state; and semaphore releasing including determining whether an interrupt service routine that waits for a semaphore to be released exists, based on usage information that is held by a semaphore structure corresponding to a semaphore that is to be released by the interrupt service routine executed at the scheduling; releasing, when it is determined that the interrupt service routine that waits for the semaphore to be released exists, a semaphore from an interrupt service routine executed by updating information on an interrupt service routine that acquired a semaphore and information on an interrupt service routine that waits for a semaphore, from among the usage information, based on information on the interrupt service routine that releases the semaphore and information on the interrupt service routine that waits for the semaphore; causing the interrupt service routine that waits for the semaphore to acquire a released semaphore; setting an interrupt control block corresponding to the interrupt service routine that newly acquired the semaphore to an execution-waiting state; and releasing, when it is determined that the interrupt service routine that waits for the semaphore to be released does not exist, the semaphore by updating information on number of available semaphores and information on the interrupt service routine that acquired the semaphore, from among the usage information, based on the information on the interrupt service routine that releases the semaphore.

3. The real-time embedded simple monitor method according to claim 2, wherein the usage information includes number of semaphores in which the number of available semaphores is set; a possessing interrupt-service-routine in which an interrupt-service-routine identifier for identifying an interrupt service routine that possesses a semaphore; and a waiting interrupt-service-routine in which an interrupt-service-routine identifier for identifying an interrupt service routine that is in the semaphore-waiting state, the semaphore acquiring further includes decrementing, when a value of the number of semaphores of the semaphore structure corresponding to the semaphore that is requested by the interrupt service routine executed at the scheduling is equal to or larger than 1, the value of the number of semaphores; acquiring the semaphore by setting an interrupt-service-routine identifier of an interrupt service routine that requested the semaphore to the possessing interrupt-service-routine; and setting the interrupt control block corresponding to the interrupt service routine that requested the semaphore to the semaphore-waiting state by setting the interrupt-service-routine identifier of the interrupt service routine that requested the semaphore to the waiting interrupt-service-routine, and the semaphore releasing further includes incrementing a value of the number of semaphores of the semaphore structure corresponding to the semaphore that is released by the interrupt service routine executed at the scheduling; deleting an interrupt-service-routine identifier of an interrupt service routine that releases the semaphore that is set in the possessing interrupt-service-routine; decrementing, when an interrupt-service-routine identifier is set in the waiting interrupt-service-routine, the value of the number of semaphores, and setting the interrupt-service-routine identifier that is set in the waiting interrupt-service-routine to the possessing interrupt-service-routine, deleting the interrupt-service-routine identifier set in the waiting interrupt-service-routine, and setting an interrupt control block corresponding to an interrupt service routine that newly acquired the semaphore to an execution-waiting state.

4. The real-time embedded simple monitor method according to claim 1, wherein the interrupt-service-routine starting further includes causing an interrupt control block to hold number of interrupts by incrementing a value of an execution counter of an interrupt control block corresponding to an interrupt service routine that performs a process of the occurred interrupt, for every interrupts, the scheduling further includes executing an interrupt service routine as many times as the number of interrupts by taking a corresponding interrupt control block as a selection target as many times as the number of interrupts that is held by the execution counter, and the interrupt-service-routine exiting further includes decrementing the value of the execution counter.

5. The real-time embedded simple monitor method according to claim 4, wherein an upper-limit of number of executions is registered in each of the interrupt control blocks, and the interrupt-service-routine starting further includes incrementing, when the value of the execution counter of an interrupt control block corresponding to an interrupt service routine that performs a process of the interrupt is equal to or smaller than the upper-limit of number of executions, the value of the execution counter.

6. The real-time embedded simple monitor method according to claim 2, wherein the semaphore acquiring further includes comparing, when it is determined that the request semaphore is not available, a priority of an interrupt service routine that possesses the request semaphore with a priority of the interrupt service routine that requested the semaphore, changing, when the priority of the interrupt service routine that possesses the request semaphore is lower than the priority of the interrupt service routine that requested the semaphore, a connection of the interrupt-control-block sequence so that the priority of the interrupt service routine that possesses the request semaphore is changed with the priority of the interrupt service routine that requested the semaphore, and setting information indicating that the priorities are changed to an interrupt control block corresponding to the interrupt service routine of which the priority has been changed, and the semaphore releasing further includes changing, when the information indicating that the priorities are changed is to an interrupt control block corresponding to the interrupt service routine that releases the semaphore, the connection of the interruptcontrol-block sequence so that a current priority of the interrupt service routine that releases the semaphore is changed with a current priority of an interrupt service routine of which the priority has been changed with the priority of the interrupt service routine that releases the semaphore, and setting information indicating that there is no change of the priorities to an interrupt control block corresponding to the interrupt service routine of which the priority has been changed.

7. The real-time embedded simple monitor method according to claim 4, wherein the semaphore acquiring further includes comparing, when it is determined that the request semaphore is not available, a priority of an interrupt service routine that possesses the request semaphore with a priority of the interrupt service routine that requested the semaphore, changing, when the priority of the interrupt service routine that possesses the request semaphore is lower than the priority of the interrupt service routine that requested the semaphore, a connection of the interrupt-control-block sequence so that the priority of the interrupt service routine that possesses the request semaphore is changed with the priority of the interrupt service routine that requested the semaphore, and setting information indicating that the priorities are changed to an interrupt control block corresponding to the interrupt service routine of which the priority has been changed, and the semaphore releasing further includes changing, when the information indicating that the priorities are changed is to an interrupt control block corresponding to the interrupt service routine that releases the semaphore, the connection of the interrupt-control-block sequence so that a current priority of the interrupt service routine that releases the semaphore is changed with a current priority of an interrupt service routine of which the priority has been changed with the priority of the interrupt service routine that releases the semaphore, and setting information indicating that there is no change of the priorities to an interrupt control block corresponding to the interrupt service routine of which the priority has been changed.

8. A computer system storing and executing a real-time embedded simple monitor program for performing a scheduling of a plurality of interrupt service routines based on a semaphore structure and an interrupt-control-block sequence, the real-time embedded simple monitor program causing a computer to execute: interrupt-service-routine starting including saving, when an interrupt occurs, a value of a program counter, a stack pointer that is a value of a stack register, and a context stored in a stack area at a time of the interrupt occurrence, in a context saving area of an interrupt control block corresponding to an interrupt service routine that is interrupted; and setting the interrupt control block corresponding to the occurred interrupt to an execution-waiting state; scheduling including selecting an interrupt control block having a highest priority from among the interrupt control blocks that are set to the execution-waiting state; saving a value of a program counter, a stack pointer, and a context stored in a context saving area of the selected interrupt control block, in the stack area; and executing an interrupt service routine selected by an interrupt return command; and interrupt-service-routine exiting including setting, when exiting a process of the interrupt service routine executed at the scheduling, an interrupt control block corresponding to the exiting interrupt service routine to an interrupt-waiting state, wherein the semaphore structure is applied to an embedded software configured with the interrupt service routines including a steady-state, is associated with a plurality of semaphores used for the interrupt service routines, and holds information on a usage state of the semaphores, and in the interrupt-control-block sequence, plural interrupt control blocks holding information on a state of each of the interrupt service routines corresponding to interrupt levels of the interrupt service routines are connected in order of a priority of the interrupt level.

9. The computer system according to claim 8, the real-time embedded simple monitor program further causing the computer to execute: semaphore acquiring including determining whether a request semaphore is available based on usage information that is held by a semaphore structure corresponding to a semaphore that is requested by the interrupt service routine executed at the scheduling; causing, when it is determined that the request semaphore is available, an interrupt service routine executed by updating information on number of available semaphores and information on the interrupt service routine that acquired the semaphore, from among the usage information, based on information on the interrupt service routine that requested the semaphore, to acquire the semaphore; updating, when it is determined that the request semaphore is not available, information on an interrupt service routine that is in a semaphore-waiting state from among the usage information, based on the information on the interrupt service routine that requested the semaphore; and setting an interrupt control block corresponding to the interrupt service routine that requested the semaphore to the semaphore-waiting state; and semaphore releasing including determining whether an interrupt service routine that waits for a semaphore to be released exists, based on usage information that is held by a semaphore structure corresponding to a semaphore that is to be released by the interrupt service routine executed at the scheduling; releasing, when it is determined that the interrupt service routine that waits for the semaphore to be released exists, a semaphore from an interrupt service routine executed by updating information on an interrupt service routine that acquired a semaphore and information on an interrupt service routine that waits for a semaphore, from among the usage information, based on information on the interrupt service routine that releases the semaphore and information on the interrupt service routine that waits for the semaphore; causing the interrupt service routine that waits for the semaphore to acquire released semaphore; setting an interrupt control block corresponding to the interrupt service routine that newly acquired the semaphore to an execution-waiting state; and releasing, when it is determined that the interrupt service routine that waits for the semaphore to be released does not exist, the semaphore by updating information on number of available semaphores and information on the interrupt service routine that acquired the semaphore, from among the usage information, based on the information on the interrupt service routine that releases the semaphore.

10. The computer system according to claim 9, wherein the usage information includes number of semaphores in which the number of available semaphores is set; a possessing interrupt-service-routine in which an interrupt-service-routine identifier for identifying an interrupt service routine that possesses a semaphore; and a waiting interrupt-service-routine in which an interrupt-service-routine identifier for identifying an interrupt service routine that is in the semaphore-waiting state, the semaphore acquiring further includes decrementing, when a value of the number of semaphores of the semaphore structure corresponding to the semaphore that is requested by the interrupt service routine executed at the scheduling is equal to or larger than 1, the value of the number of semaphores; acquiring the semaphore by setting an interrupt-service-routine identifier of an interrupt service routine that requested the semaphore to the possessing interrupt-service-routine; and setting the interrupt control block corresponding to the interrupt service routine that requested the semaphore to the semaphore-waiting state by setting the interrupt-service-routine identifier of the interrupt service routine that requested the semaphore to the waiting interrupt-service-routine, and the semaphore releasing further includes incrementing a value of the number of semaphores of the semaphore structure corresponding to the semaphore that is released by the interrupt service routine executed at the scheduling; deleting an interrupt-service-routine identifier of an interrupt service routine that releases the semaphore that is set in the possessing interrupt-service-routine; decrementing, when an interrupt-service-routine identifier is set in the waiting interrupt-service-routine, the value of the number of semaphores, and setting the interrupt-service-routine identifier that is set in the waiting interrupt-service-routine to the possessing interrupt-service-routine, deleting the interrupt-service-routine identifier set in the waiting interrupt-service-routine, and setting an interrupt control block corresponding to an interrupt service routine that newly acquired the semaphore to an execution-waiting state.

11. The computer system according to claim 8, wherein the interrupt-service-routine starting further includes causing an interrupt control block to hold number of interrupts by incrementing a value of an execution counter of an interrupt control block corresponding to an interrupt service routine that performs a process of the occurred interrupt, for every interrupts, the scheduling further includes executing an interrupt service routine as many times as the number of interrupts by taking a corresponding interrupt control block as a selection target as many times as the number of interrupts that is held by the execution counter, and the interrupt-service-routine exiting further includes decrementing the value of the execution counter.

12. The computer system according to claim 11, wherein an upper-limit of number of executions is registered in each of the interrupt control blocks, and the interrupt-service-routine starting further includes incrementing, when the value of the execution counter of an interrupt control block corresponding to an interrupt service routine that performs a process of the interrupt is equal to or smaller than the upper- limit of number of executions, the value of the execution counter.

13. The computer system according to claim 9, wherein the semaphore acquiring further includes comparing, when it is determined that the request semaphore is not available, a priority of an interrupt service routine that possesses the request semaphore with a priority of the interrupt service routine that requested the semaphore, changing, when the priority of the interrupt service routine that possesses the request semaphore is lower than the priority of the interrupt service routine that requested the semaphore, a connection of the interrupt-control-block sequence so that the priority of the interrupt service routine that possesses the request semaphore is changed with the priority of the interrupt service routine that requested the semaphore, and setting information indicating that the priorities are changed to an interrupt control block corresponding to the interrupt service routine of which the priority has been changed, and the semaphore releasing further includes changing, when the information indicating that the priorities are changed is to an interrupt control block corresponding to the interrupt service routine that releases the semaphore, the connection of the interrupt-control-block sequence so that a current priority of the interrupt service routine that releases the semaphore is changed with a current priority of an interrupt service routine of which the priority has been changed with the priority of the interrupt service routine that releases the semaphore, and setting information indicating that there is no change of the priorities to an interrupt control block corresponding to the interrupt service routine of which the priority has been changed.

14. The computer system according to claim 11, wherein the semaphore acquiring further includes comparing, when it is determined that the request semaphore is not available, a priority of an interrupt service routine that possesses the request semaphore with a priority of the interrupt service routine that requested the semaphore, changing, when the priority of the interrupt service routine that possesses the request semaphore is lower than the priority of the interrupt service routine that requested the semaphore, a connection of the interrupt-control-block sequence so that the priority of the interrupt service routine that possesses the request semaphore is changed with the priority of the interrupt service routine that requested the semaphore, and setting information indicating that the priorities are changed to an interrupt control block corresponding to the interrupt service routine of which the priority has been changed, and the semaphore releasing further includes changing, when the information indicating that the priorities are changed is to an interrupt control block corresponding to the interrupt service routine that releases the semaphore, the connection of the interrupt-control-block sequence so that a current priority of the interrupt service routine that releases the semaphore is changed with a current priority of an interrupt service routine of which the priority has been changed with the priority of the interrupt service routine that releases the semaphore, and setting information indicating that there is no change of the priorities to an interrupt control block corresponding to the interrupt service routine of which the priority has been changed.

15. A computer-readable recording medium that stores therein a real-time embedded simple monitor program for performing a scheduling of a plurality of interrupt service routines based on a semaphore structure and an interrupt-control-block sequence, wherein the real-time embedded simple monitor program causes a computer to execute: interrupt-service-routine starting including saving, when an interrupt occurs, a value of a program counter, a stack pointer that is a value of a stack register, and a context stored in a stack area at a time of the interrupt occurrence, in a context saving area of an interrupt control block corresponding to an interrupt service routine that is interrupted; and setting the interrupt control block corresponding to the occurred interrupt to an execution-waiting state; scheduling including selecting an interrupt control block having a highest priority from among the interrupt control blocks that are set to the execution-waiting state; saving a value of a program counter, a stack pointer, and a context stored in a context saving area of the selected interrupt control block, in the stack area; and executing an interrupt service routine selected by an interrupt return command; and interrupt-service-routine exiting including setting, when exiting a process of the interrupt service routine executed at the scheduling, an interrupt control block corresponding-to the exiting interrupt service routine to an interrupt-waiting state, wherein the semaphore structure is applied to an embedded software configured with the interrupt service routines including a steady-state, is associated-with a plurality of semaphores used for the interrupt service routines, and holds information on a usage state of the semaphores, and in the interrupt-control-block sequence, plural interrupt control blocks holding information on a state of each of the interrupt service routines corresponding to interrupt levels of the interrupt service routines are connected in order of a priority of the interrupt level.

16. The computer-readable recording medium according to claim 15, wherein the real-time embedded simple monitor program further causes the computer to execute: semaphore acquiring including determining whether a request semaphore is available based on usage information that is held by a semaphore structure corresponding to a semaphore that is requested by the interrupt service routine executed at the scheduling; causing, when it is determined that the request semaphore is available, an interrupt service routine executed by updating information on number of available semaphores and information on the interrupt service routine that acquired the semaphore, from among the usage information, based on information on the interrupt service routine that-requested the semaphore, to acquire the semaphore; updating, when it is determined that the request semaphore is not available, information on an interrupt service routine that is in a semaphore-waiting state from, among the usage information, based on the information on the interrupt service routine that requested the semaphore; and setting an interrupt control block corresponding to the interrupt service routine that requested the semaphore to the semaphore-waiting state; and semaphore releasing including determining whether an interrupt service routine that waits for a semaphore to be released exists, based on usage information that is held by a semaphore structure corresponding to a semaphore that is to be released by the interrupt service routine executed at the scheduling; releasing, when it is determined that the interrupt service routine that waits for the semaphore to be released exists, a semaphore from an interrupt service routine executed by updating information on an interrupt service routine that acquired a semaphore and information on an interrupt service routine that waits for a semaphore, from among the usage information, based on information on the interrupt service routine that releases the semaphore and information on the interrupt service routine that waits for the semaphore; causing the interrupt service routine that waits for the semaphore to acquire released semaphore; setting an interrupt control block corresponding to the interrupt service routine that newly acquired the semaphore to an execution-waiting state; and releasing, when it is determined that the interrupt service routine that waits for the semaphore to be released does not exist, the semaphore by updating information on number of available semaphores and information on the interrupt service routine that acquired the semaphore, from among the usage information, based on the information on the interrupt service routine that releases the semaphore.

17. The computer-readable recording medium according to claim 16, wherein the usage information includes number of semaphores in which the number of available semaphores is set; a possessing interrupt-service-routine in which an interrupt-service-routine identifier for identifying an interrupt service routine that possesses-a semaphore; and a waiting interrupt-service-routine in which an interrupt-service-routine identifier for identifying an interrupt service routine that is in the semaphore-waiting state, the semaphore acquiring further includes decrementing, when a value of the number of semaphores of the semaphore structure corresponding to the semaphore that is requested by the interrupt service routine executed at the scheduling is equal to or larger than 1, the value of the number of semaphores; acquiring the semaphore by setting an interrupt-service-routine identifier of an interrupt service routine that requested the semaphore to the possessing interrupt-service-routine; and setting the interrupt control block corresponding to the interrupt service routine that requested the semaphore to the semaphore-waiting state by setting the interrupt-service-routine identifier of the interrupt service routine that requested the semaphore to the waiting interrupt-service-routine, and the semaphore releasing further includes incrementing a value of the number of semaphores of the semaphore structure corresponding to the semaphore that is released by the interrupt service routine executed at the scheduling; deleting an interrupt-service-routine identifier of an interrupt service routine that releases the semaphore that is set in the possessing interrupt-service-routine; decrementing, when an interrupt-service-routine identifier is set in the waiting interrupt-service-routine, the value of the number of semaphores, and setting the interrupt-service-routine identifier that is set in the waiting interrupt-service-routine to the possessing interrupt-service-routine., deleting the interrupt-service- routine identifier set in the waiting interrupt-service-routine, and setting an interrupt control block corresponding to an interrupt service routine that newly acquired the semaphore to an execution-waiting state.

18. The computer-readable recording medium according to claim 15, wherein the interrupt-service-routine starting further includes causing an interrupt control block to hold number of interrupts by incrementing a value of an execution counter of an interrupt control block corresponding to an interrupt service routine that performs a process of the occurred interrupt, for every interrupts, the scheduling further includes executing an interrupt service routine as many times as the number of interrupts by taking a corresponding interrupt control block as a selection target as many times as the number of interrupts that is held by the execution counter, and the interrupt-service-routine exiting further includes decrementing the value of the execution counter.

19. The computer-readable recording medium according to claim 18, wherein an upper-limit of number of executions is registered in each of the interrupt control blocks, and the interrupt-service-routine starting further includes incrementing, when the value of the execution counter of an interrupt control block corresponding to an interrupt service routine that performs a process of the interrupt is equal to or smaller than the upper-limit of number of executions, the value of the execution counter.

20. The computer-readable recording medium according to claim 16, wherein the semaphore acquiring further includes comparing, when it is determined that the request semaphore is not available, a priority of an interrupt service routine that possesses the request semaphore with a priority of the interrupt service routine that requested the semaphore, changing, when the priority of the interrupt service routine that possesses the request semaphore is lower than the priority of the interrupt service routine that requested the semaphore, a connection of the interrupt-control-block sequence so that the priority of the interrupt service routine that possesses the request semaphore is changed with the priority of the interrupt service routine that requested the semaphore, and setting information indicating that the priorities are changed to an interrupt control block corresponding to the interrupt service routine of which the priority has been changed, and the semaphore releasing further includes changing, when the information indicating that the priorities are changed is to an interrupt control block corresponding to the interrupt service routine that releases the semaphore, the connection of the interrupt-control-block sequence so that a current priority of the interrupt service routine that releases the semaphore is changed with a current priority of an interrupt service routine of which the priority has been changed with the priority of the interrupt service routine that releases the semaphore, and setting information indicating that there is no change of the priorities to an interrupt control block corresponding to the interrupt service routine of which the priority has been changed.

21. The real-time embedded simple monitor program according to claim 18, wherein the semaphore acquiring further includes comparing, when it is-determined that the request semaphore is not available, a priority of an interrupt service routine that possesses the request semaphore with a priority of the interrupt service routine that requested the semaphore, changing, when the priority of the interrupt service routine that possesses the request semaphore is lower than the priority of the interrupt service routine that requested the semaphore, a connection of the interrupt-control-block sequence so that the priority of the interrupt service routine that possesses the request semaphore is changed with the priority of the interrupt service routine that requested the semaphore, and setting information indicating that the priorities are changed to an interrupt control block corresponding to the interrupt service routine of which the priority has been changed, and the semaphore releasing further includes changing, when the information indicating that the priorities are changed is to an interrupt control block corresponding to the interrupt service routine that releases the semaphore, the connection of the interrupt-control-block sequence so that a current priority of the interrupt service routine that releases the semaphore is changed with a current priority of an interrupt service routine of which the priority has been changed with the priority of the interrupt service routine that releases the semaphore, and setting information indicating that there is no change of the priorities to an interrupt control block corresponding to the interrupt service routine of which the priority has been changed.

22. The real-time embedded simple monitor method according to claim 1, wherein each of the interrupt control blocks corresponds uniquely to one of the interrupt service routines.

23. The computer-readable recording medium according to claim 15, wherein each of the interrupt control blocks corresponds uniquely to one of the interrupt service routines.

* * * * *